United States Patent
O'Neill

(10) Patent No.: US 12,147,754 B2
(45) Date of Patent: *Nov. 19, 2024

(54) OFFLINE INTERACTIVE NATURAL LANGUAGE PROCESSING RESULTS

(71) Applicant: Patent Bots, Inc., Somerville, MA (US)

(72) Inventor: Jeffrey C. O'Neill, Somerville, MA (US)

(73) Assignee: Patent Bots, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,451

(22) Filed: Aug. 23, 2023

(65) Prior Publication Data

US 2023/0394224 A1    Dec. 7, 2023

Related U.S. Application Data

(63) Continuation of application No. 17/532,122, filed on Nov. 22, 2021, now Pat. No. 11,768,995, which is a
(Continued)

(51) Int. Cl.
    *G06F 40/137*      (2020.01)
    *G06F 40/106*      (2020.01)
    (Continued)

(52) U.S. Cl.
CPC .......... *G06F 40/137* (2020.01); *G06F 40/106* (2020.01); *G06F 40/143* (2020.01); *G06F 40/284* (2020.01); *G06F 40/289* (2020.01)

(58) Field of Classification Search
CPC .... G06F 40/137; G06F 40/106; G06F 40/143; G06F 40/284; G06F 40/289
(Continued)

(56) References Cited

U.S. PATENT DOCUMENTS 11,194,956 B2 * 12/2021 O'Neill ................. G06F 40/106
11,768,995 B2 * 9/2023 O'Neill ................. G06F 40/137
                                                                                                                 704/9
(Continued)

FOREIGN PATENT DOCUMENTS

EP      2531909 A1    12/2012
EP      2531909 A4    7/2013
(Continued)

OTHER PUBLICATIONS

Claimmaster Software LLC, Screenshot of ClaimMaster software (www.patentclaimmaster.com) taken on Jul. 20, 2018, 1 page.
(Continued)

*Primary Examiner* — Edwin S Leland, III
(74) *Attorney, Agent, or Firm* — GTC Law Group PC & Affiliates

(57) ABSTRACT

Interactive natural language processing (NLP) results may be generated that allow a user to interact with the NLP results but do so in an offline manner so that the documents being processed need not be stored online. To provide interactive NLP results, event handlers may be attached to elements of the NLP results. A user may then select a word or phrase of the NLP results to cause computer software provided with the NLP to present the interactive features. For example, a user may click on a definite noun phrase to view information for diagnosing antecedent basis errors. For another example, a user may click on a word to view information about how that word is used in a document, such as viewing portions of the document that include the word or variants of the word.

20 Claims, 16 Drawing Sheets

Related U.S. Application Data continuation of application No. 16/394,445, filed on Apr. 25, 2019, now Pat. No. 11,194,956.

(60) Provisional application No. 62/793,245, filed on Jan. 16, 2019, provisional application No. 62/664,326, filed on Apr. 30, 2018.

(51) Int. Cl.
*G06F 40/143* (2020.01)
*G06F 40/284* (2020.01)
*G06F 40/289* (2020.01)

(58) Field of Classification Search
USPC .................................................. 704/9
See application file for complete search history.

(56) References Cited

U.S. PATENT DOCUMENTS

| | | | |
|---|---|---|---|
| 2001/0049707 A1* | 12/2001 | Tran | G06F 40/131 715/256 |
| 2004/0034836 A1* | 2/2004 | Ikeno | 715/255 |
| 2004/0103112 A1* | 5/2004 | Colson | G06F 16/345 707/999.102 |
| 2006/0059413 A1* | 3/2006 | Tran | G06F 40/20 715/256 |
| 2006/0206472 A1* | 9/2006 | Masuichi | G06F 16/9535 |
| 2008/0086507 A1* | 4/2008 | Szygenda | G06F 16/3322 |
| 2009/0210828 A1* | 8/2009 | Kahn | G06F 3/0484 715/205 |
| 2011/0055744 A1* | 3/2011 | Ryan | G06F 8/34 715/764 |
| 2011/0191310 A1* | 8/2011 | Liao | G06F 16/313 707/723 |
| 2013/0086469 A1* | 4/2013 | Lundberg | G06F 16/93 715/255 |
| 2013/0282735 A1* | 10/2013 | Pedersen | G06F 16/3323 707/748 |
| 2014/0200880 A1* | 7/2014 | Neustel | G06F 40/279 704/9 |
| 2015/0339279 A1* | 11/2015 | Fujisawa | G06F 16/93 715/257 |
| 2015/0379439 A1* | 12/2015 | Klein | G06Q 10/06 705/310 |
| 2016/0042460 A1* | 2/2016 | Hudak | G06Q 40/06 705/310 |
| 2016/0048488 A1* | 2/2016 | Cook | G06F 16/334 715/257 |
| 2016/0048512 A1* | 2/2016 | Cook | G06F 16/93 707/722 |
| 2016/0055146 A1* | 2/2016 | Hayase | G06F 40/169 704/9 |
| 2017/0075877 A1* | 3/2017 | Lepeltier | G06F 40/117 |
| 2017/0193074 A1* | 7/2017 | Vellal | G06F 16/24568 |
| 2017/0337650 A1* | 11/2017 | Volin | G06F 16/2423 |
| 2018/0122256 A1* | 5/2018 | Smith | G09B 7/00 |
| 2018/0189909 A1* | 7/2018 | Zellner | G06F 16/93 |
| 2018/0253486 A1* | 9/2018 | Crouse | G06F 40/194 |
| 2018/0253810 A1* | 9/2018 | Edmund | G06F 40/253 |
| 2019/0179839 A1* | 6/2019 | Elias | G06F 16/3322 |
| 2019/0179893 A1* | 6/2019 | Mulwad | G06N 5/00 |
| 2019/0332664 A1* | 10/2019 | O'Neill | G06F 40/137 |
| 2019/0340217 A1* | 11/2019 | Tran | G06F 40/174 |
| 2022/0156450 A1* | 5/2022 | O'Neill | G06F 40/106 |

FOREIGN PATENT DOCUMENTS

| | | | | |
|---|---|---|---|---|
| EP | 3330867 A1 | 6/2018 | | |
| WO | 2005114468 A2 | 12/2005 | | |
| WO | 2005114468 A3 | 8/2006 | | |
| WO | WO-2014100202 A1 * | 6/2014 | ............ | G06F 16/00 |
| WO | 2018152261 A1 | 8/2018 | | |

OTHER PUBLICATIONS

Claimmaster Software LLC, PDF proofreading report generated by ClaimMaster software (www.patentclaimmaster.com) on Jul. 20, 2018, 21 pages.

LEXISNEXIS, Screenshot of PatentOptimizer software (www.lexisnexis.com/products/patent-optimizer/) taken on Oct. 29, 2018, 1 page.

LEXISNEXIS, PDF proofreading report generated by PatentOptimizer software (www.lexixnexis.com/products/patent-optimizer/) on Oct. 29, 2018, 14 pages.

* cited by examiner

Analysis Results

| Title: | Banana Eating |
| --- | --- |
| Application: | banana.docx |
| Drawings: | drawings.pptx |

Check again after saving your modifications:

[Analyze Again]

| Overview | Numbering | Antecedent Basis | Word Support | Phrase Support | Ref Labels | Fig Numbers | Spec |

- Claim 1
  - Claim 2
  - Claim 3
    - Claim 4
- Claim 5
  - Claim 6
  - Claim 7

Fig. 3

```
<html>
<head>
<title>Patent Analysis Results</title>
<link rel="stylesheet" href="/main.css" />
<script src="/main.js"></script>
...
</head>
<body>
...
<div class="tab-pane active" id="overview">
<h2>Overview</h2>
...
</div>
<div class="tab-pane" id="numbering">
<h2>Claim Numbering Errors</h2>
...
</div>
<div class="tab-pane" id="overview">
<h2>Specification</h2>
...
</div>
...
</body>
</html>
```

Fig. 4A

```
.ab-good, .support-good, .rl-good {
    background-color: #87cf32;
}
.ab-error, .support-error, .rl-error {
    background-color: #f36565;
}
.ab-warning, .support-warning, .rl-warning {
    background-color: #fcd050;
}
.red-under {
    border-bottom: 2px solid #f36565;
}
...
```

Fig. 4B

```
...
function bold_noun_phrase_words() {
    var noun_phrase = $(this);
    noun_phrase.find('span').each(function() {
        var lemma = $(this).data('lemma');
        $('#ab').find('[data-lemma="' + lemma + '"]').each(function() {
            $(this).css('font-weight', 900);
        });
    });
}
...
```

Fig. 4C

1. A method for eating a banana, comprising:
   buying a banana from the store;
   peeling the banana; and
   eating the peeled banana.

Fig. 5A

1. A method for eating a banana, comprising:
   buying a banana from the store;
   peeling the banana; and
   eating the peeled banana.

Fig. 5B

1. A method for eating a banana, comprising:
   buying a banana from the store;
   peeling the banana; and
   eating the peeled banana.

Fig. 5C

```
<div id="ab">
<div class="claim">
<div class="claim-line">
1.
<span class="indef-np">A <span data-lemma="method">method</span></span>
for
<span data-lemma="eat">eating</span>
<span class="indef-np">a <span data-lemma="banana">banana</span></span>,
<span data-lemma="comprise">comprising</span>:
</div>
<div class="claim-line">
<span data-lemma="buy">buying</span>
<span class="red-under">a <span data-lemma="banana">banana</span></span>
from
<span class="ab-error">the <span data-lemma="store">store</span></span>;
</div>
<div class="claim-line">
<span data-lemma="peel">peeling</span>
<span class="ab-good">the banana</span>;
and
</div>
<div class="claim-line">
<span data-lemma="eat">eating</span>
<span class="ab-warning">the
  <span data-lemma="peel">peeled</span>
  <span data-lemma="banana">banana</span>
</span>.
</div>
</div>
```

Fig. 6

1. A method for eating a banana, comprising:
   buying a banana from the store;
   peeling the banana; and
   eating the peeled banana.

eating: 10
   eats: 6
   eat: 2

Fig. 8A

Support for banana in 7 paragraphs

▼ Paragraph 3 of 7 △ △

A banana 100 may be purchased from a commercial establishment 120. You can walk into commercial establishment 120 to start the shopping process. From a display 110 of bananas 120, you may pick a bunch of bananas 100 or a single banana 100.

Fig. 8B

```
<div id="word-support">
<div class="claim">
<div class="claim-line">
1. A
<span data-toggle="tooltip" title="method: 1" class="support-warning">method</span>
for
<span data-toggle="tooltip" title="eating: 10<br>eats: 2" class="support-good">eating</span>
a
<span data-toggle="tooltip" title="banana: 25 <br>bananas: 3" class="support-good">banana</span>,
comprising:
</div>
<div class="claim-line">
<span data-toggle="tooltip" title="buying: 3" class="support-warning">buying</span>
a
<span data-toggle="tooltip" title="banana: 25 <br>bananas: 3" class="support-good">banana</span>
from the
<span data-toggle="tooltip" title="store: 0" class="support-error">store</span>;
</div>
<div class="claim-line">
<span data-toggle="tooltip" title="peeling: 6<br>peeled: 6" class="support-good">peeling</span>
the
<span data-toggle="tooltip" title="banana: 25 <br>bananas: 3" class="support-good">banana</span>; and
</div>
...
</div>
</div>
</div>
```

Fig. 9

| Label | Specification | | Drawings |
|---|---|---|---|
| | Label Text | Count | |
| 100 | banana<br>peeled bananas<br><no text> | 37<br>5<br>1 | 1, 3, 4 |
| 110 | display | 3 | 1 |
| 120 | commercial establishment<br>banana | 5<br>1 | 2 |
| 130 | apple | 1 | No |
| 140 | | No | 2 |

Fig. 11A

2 paragraphs with "display 110"

▽ ▽ Paragraph 1 of 2 ▽ ▽

A banana 100 may be purchased from a commercial establishment 120. You can walk into commercial establishment 120 to start the shopping process. From a display 110 of bananas 100, you may pick a bunch of bananas 100 or a single banana 100.

Fig. 11B

```
<tr>
<td class="label-num">100</td>
<td class="label-text rl-warning">
  <span data-label="banana">banana</span><br>
  <span data-label="peeled bananas">peeled bananas</span><br>
  <span data-label="">no text</span>
</td>
<td class="rl-warning">37<br>5<br>1</td>
<td class="rl-good">1, 3, 4</td>
</tr>
<tr>
<td class="label-num">110</td>
<td class="label-text rl-good"><span data-label="display">display</span></td>
<td class="rl-good">3</td>
<td class="rl-good">1</td>
</tr>
<tr>
<td class="label-num">120</td>
<td class="label-text rl-error">
  <span data-label="commercial establishment">commercial establishment</span><br>
  <span data-label="banana">banana</span>
</td>
<td class="rl-error">2<br>1</td>
<td class="rl-good">1, 3, 4</td>
</tr>
<tr>
<td class="label-num">130</td>
<td class="label-text rl-good"><span data-label="apple">apple</span></td>
<td class="rl-good">1</td>
<td class="rl-error">No</td>
</tr>
...
```

Fig. 12

OFFLINE INTERACTIVE NATURAL LANGUAGE PROCESSING RESULTS

CLAIM OF PRIORITY

This application is a continuation of U.S. patent application Ser. No. 17/532,122, filed Nov. 22, 2021, and titled "OFFLINE INTERACTIVE NATURAL LANGUAGE PROCESSING RESULTS", published as US 2022/0156450 A1 on May 19, 2022.

U.S. patent application Ser. No. 17/532,122 is a continuation of U.S. patent application Ser. No. 16/394,445, filed Apr. 25, 2019, and titled "OFFLINE INTERACTIVE NATURAL LANGUAGE PROCESSING RESULTS", now U.S. Pat. No. 11,194,956 issued on Dec. 7, 2021.

U.S. patent application Ser. No. 16/394,445 claims the benefit of priority to U.S. Provisional Patent App. Ser. No. 62/664,326, filed Apr. 30, 2018, and titled "PREDICTING FUTURE PATENT OUTCOMES"; and U.S. Provisional Patent App. Ser. No. 62/793,245, filed Jan. 16, 2019, and titled "OFFLINE INTERACTIVE NATURAL LANGUAGE PROCESSING RESULTS".

Each of the foregoing applications is hereby incorporated by reference in its entirety.

BACKGROUND

Natural language processing (NLP) may be used to facilitate the usage, understanding or improvement of documents. For example, NLP tools may include proofreading of documents, automated generation of documents, checking documents for plagiarism, translation of documents, or summarization of documents. Networked or cloud services may be available to provide natural language processing of documents, and cloud-based NLP tools may provide convenience or improved performance over NLP tools that are installed on end-user devices, such as personal computers. For example, cloud-based NLP tools may be faster, more accurate, and may be updated more frequently.

When processing documents of a more sensitive nature (such as confidential documents), concerns may be raised over cloud processing of the documents, such as the risk of the documents being publicly disclosed or obtained by third parties. Accordingly, it may be desired to provide techniques for natural language processing of documents that provide the convenience or performance of cloud-based tools but also reduce risks so that the risks may be more comparable with offline tools.

BRIEF DESCRIPTION OF THE FIGURES

The invention and the following detailed description of certain embodiments thereof may be understood by reference to the following figures:

FIG. 3 is an example user interface for providing offline, interactive NLP results using cloud-based NLP tools.

FIGS. 4A-C are example data items that may be used to provide offline, interactive NLP results using cloud-based NLP tools.

FIGS. 5A-C are example user interfaces that provide interactive NLP results relating to antecedent basis of a patent claim.

FIG. 6 is an example HTML data item for providing interactive NLP results relating to antecedent basis of a patent claim.

FIGS. 8A-B are example user interfaces that provide interactive NLP results relating to word support of a patent claim.

FIG. 9 is an example HTML data item for providing interactive NLP results relating to word support of a patent claim.

FIGS. 11A-B are example user interfaces that provide interactive NLP results relating to reference labels of a patent application.

FIG. 12 is an example HTML data item for providing interactive NLP results relating to reference labels of a patent application.

DETAILED DESCRIPTION

Network or cloud-based natural language processing (NLP) tools are available for a wide variety of applications. For example, cloud-based NLP tools may include proofreading of documents, automated generation of documents, checking documents for plagiarism, translation of documents, or summarization of documents. Companies may provide tools in the form of software as a service (SAAS) to make it easy for end users to perform natural language processing of their documents. In some implementations, a company may store a user's documents to facilitate additional processing of the documents or provide an interactive application where the user is able to interact with a first set of results to obtain additional information about the first set of results or to do another type of processing to obtain a second set of results.

For some applications, the documents being processed may be of a sensitive nature, such as confidential documents. Users may desire to use the cloud-based tools, but may be cautious of having their documents stored in the cloud. Accordingly, the techniques described herein are adapted to provide many of the benefits of cloud-based tools, but in a manner that reduces security concerns of users. In some implementations, the cloud services described herein may process a user's document, provide results back to the user in a manner that allows the user to interact with the results offline, and immediately discard all information about the document. For example, the cloud services may process the user's document in the volatile memory of the computer performing the processing without storing the document or information about the contents of the document to a database or other non-volatile storage.

Figure 1:
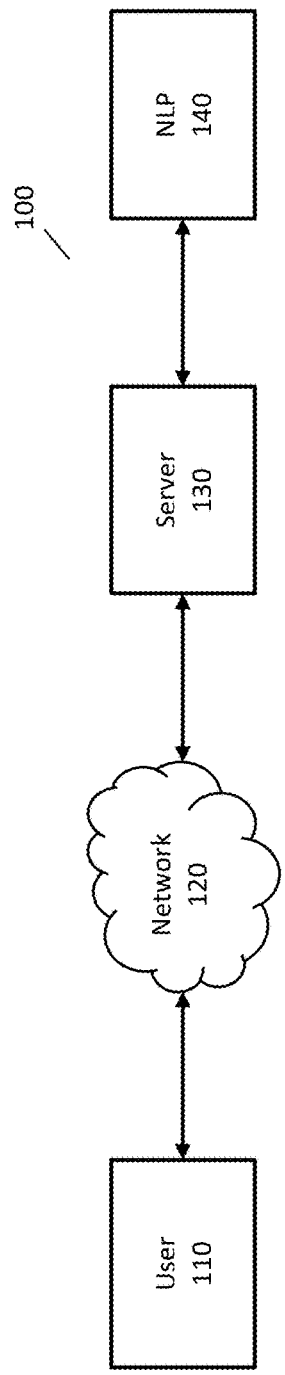
FIG. 1 is an example of a system for providing offline, interactive NLP results using cloud-based NLP tools.

FIG. 1 illustrates an example system 100 for providing offline, interactive NLP results using cloud-based NLP tools.

In FIG. 1, a user may use user device 110 to submit a document for NLP processing. User device 110 may be any device that allows a user to submit a document, such as a personal computer or a mobile device (e.g., a smart phone). The document may be submitted using any appropriate techniques. For example, a company providing the NLP services may provide a web page that allows the user to submit the document. The user may select the document from storage of user device 110 (or other storage location) and submit the form to send the document for processing. The user may also copy the contents of the document and paste them into a form field to submit the contents of the document.

The document may be submitted for processing using network 120. Network 120 may include any appropriate communications network, such as the Internet, a mobile device network, a wide area network, or a local area network.

The company may receive the document from the user at server computer 130. Server computer 130 may implement any appropriate techniques for assisting the processing of the document, such creating a network connection with user device 110, performing load balancing across multiple server computers, and so forth.

Server computer 130 may interact with or access NLP component 140 to perform natural language processing of the document. NLP component 140 may perform processing for any desired application of NLP (e.g., document proofreading). NLP component may provide NLP results that are transmitted to user device 110 via server computer 130. NLP component 140 may include one or both of software executed by server computer 130 or a computer different from server computer 130 that executes software for generating the NLP results.

Figure 2:
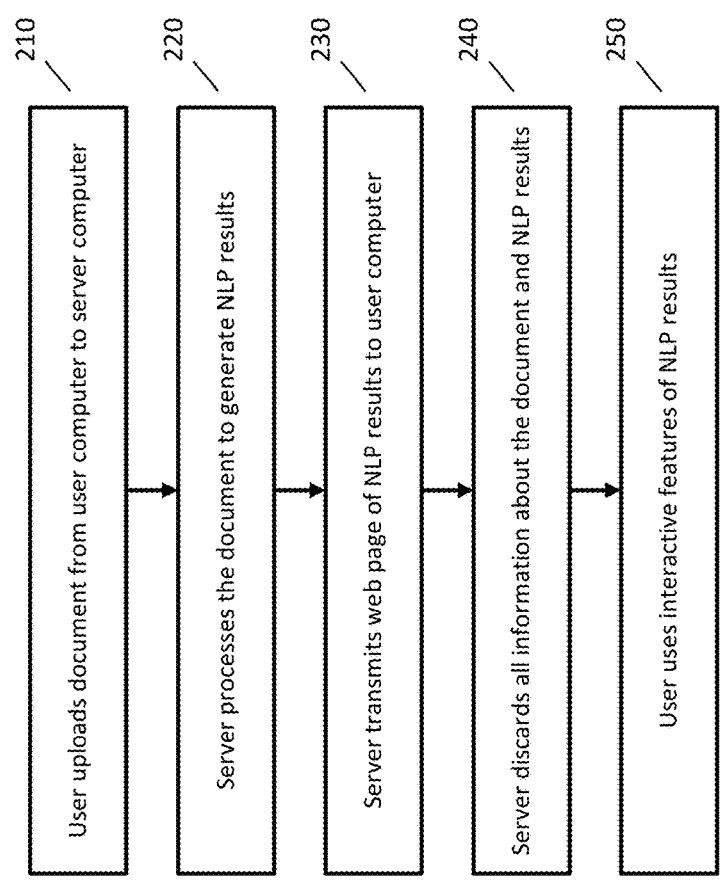
FIG. 2 is an example method for providing offline, interactive NLP results using cloud-based NLP tools.

FIG. 2 is a flowchart of an example method for providing offline, interactive NLP results using cloud-based NLP tools. In FIG. 2 and other flowcharts herein, the ordering of the steps is exemplary, not all steps are required, steps may be combined or sub-divided, or other steps may be added. The methods described by any flowcharts described herein may be implemented, for example, by any of the computers or systems described herein.

At step 210, a user uploads a document for processing by a company that provides NLP processing services. For example, a user may upload a document using a form of a web page. At step 220, one or more servers may process the document to generate NLP results. Any appropriate NLP processing may be performed, such as proofreading of the document.

The NLP results may be generated in any appropriate format, such as a web page in hypertext markup language (HTML) or extensible markup language (XML) format. In some implementations, the NLP results may include a first data item that includes HTML, a second data item that includes computer-executable software, such as JavaScript, and other data items, such as cascading style sheet (CSS) data.

At step 230, the server transmits the NLP results to the user device. For example, the server may transmit one or more data items, such as HTML, JavaScript, CSS, images, or any other appropriate data.

At step 240, the server discards all information about the document and the NLP results. In some implementations, this step may be optional, and the server may retain some information about the document for the NLP results for a limited period of time or for an extended period of time. In some implementations, the document is processed in volatile memory of the server and the document and NLP results are not saved to non-volatile storage. In some implementations, information about the document and the NLP results may be present on the server for a very short period of time, such as several seconds.

At step 250, the user receives the NLP results and is able to use interactive features of the NLP results. For example, a browser of the user's device may render the HTML to present a web page and may execute the JavaScript software to provide interactive features for the user. In some implementations, all information about the document and NLP results is no longer present on the server when the NLP results are presented on the user device.

The techniques described above in FIGS. 1 and 2 may be used with any type of document and for any appropriate application of NLP. For clarity of presentation, the techniques described herein will use a patent application (or an office action response) as an example of a document that may be processed and performing proofreading of the patent application as an example application of NLP. The techniques described herein, however, are not limited, to patent applications or proofreading documents.

FIG. 3 is an example user interface for NLP results of proofreading a patent application. The user interface of FIG. 3 may be presented using any appropriate techniques. For example, the user interface may be presented by a web browser using one or more data items, such as HTML or JavaScript. This user interface may be presented, for example, after a user has submitted one or more documents of the patent application (e.g., a Microsoft Word file with the text of the patent application or drawings in a PDF file, a Microsoft PowerPoint file, or a Microsoft Visio file).

The NLP results of FIG. 3 include information about the patent application that was processed, such as the title of the patent application and the file names of the documents that were processed. FIG. 3 also includes an "Analyze Again" button that allows the user to conveniently reprocess the patent application. For example, the user may update a Microsoft Word document of the application, and clicking the Analyze Again button may cause a form to be resubmitted with the updated Word document and cause updated NLP results to be presented to the user.

The NLP results of FIG. 3 also include multiple tabs with different aspects of the proofreading of the patent application. In FIG. 3, the contents of the Overview tab are shown and the contents of the other tabs may be shown by clicking on the tabs. The Overview tab may show a claim tree of the claims of the patent application so that a user may easily see how the claims depend from each other. The Numbering tab may show possible numbering errors of the claims of the patent application, such as skipped claim numbers, repeated claim numbers, or claims that depend on claims of a different type (e.g., a method claim that incorrectly depends from a system claim). The Antecedent Basis tab may show possible antecedent basis errors in the claims. The Word Support tab may show the support in the specification for individual words of the claims, and the Phrase Support tab may show support in the specification for phrases (e.g., two or more words) of the claims. The Ref Labels tab may show information about reference labels that were used inconsistently within the specification or inconsistently between the specification and the drawings. The FIG. Numbers tab may show information about inconsistent use of figure numbers within the specification or inconsistent use between the specification and the drawings. The Spec tab may include the text of paragraphs of the specification.

FIGS. 4A-C are example data items that may be used to provide offline, interactive NLP results using cloud-based NLP tools, such as the user interface of FIG. 3. FIG. 4A is an example of HTML data, FIG. 4B is an example of CSS data, and FIG. 4C is an example of JavaScript data. A web browser may process these data items to present a user interface using techniques known to one of skill in the art.

FIGS. 5A-C are example user interfaces that provide interactive NLP results relating to antecedent basis of a patent claim and that may be presented in the Antecedent Basis tab of FIG. 3.

FIG. 5A presents an example patent claim. In this example, portions of the claim are annotated to help the user understand possible antecedent basis errors. In a patent claim, the first time a noun phrase is presented (e.g., "banana"), the noun phase should generally be presented as an indefinite noun phrase (e.g., "a banana") with an indefinite article or no article. When the same noun phrase is repeated later in the claims, the noun phrase should generally be presented as a definite noun phrase (e.g., "the banana") with the definite article "the" (or sometimes "said" is used in place of "the").

In FIG. 5A, the definite noun phrases may be annotated to indicate whether a definite noun phrase has an antecedent basis. In this example, the definite noun phrases are annotated with highlighting (indicated as a box), and the color of the highlighting indicates whether an antecedent basis is present. For the phrase "the store", there is no previous instance of "store" in the claim so there is no antecedent basis for the phrase. Accordingly, "the store" may be highlighted in red to indicate that there is not an antecedent basis. For the phrase "the banana", there is a previous instance of "a banana" so there is an antecedent basis for the phrase. Accordingly, "the banana" may be highlighted in green to indicate that there is an antecedent basis.

In some instances, there may be a partial antecedent basis. For example, the phrase "the peeled banana" is referring to "the banana" that was peeled in the previous step. The phrase "the peeled banana" does not have an exact antecedent basis because there is no previous instance of "peeled banana" in the claim. Because there is a previous instance of "a banana" in the claim, however, there is a partial antecedent basis. In some instances, a partial antecedent basis may be an error and in some instances it may not be an error. For the example of "the peeled banana", most patent practitioners would likely deem it to not be an error because the meaning of the claim is clear. Because of the uncertainty of whether definite noun phrases with a partial antecedent basis are errors, they may be annotated differently. Accordingly, the phrase "the peeled banana" may be highlighted in yellow so that a user may determine whether or not an error is present.

Another type of error that may appear in claims is when an indefinite noun phrase is used more than once. In the example of FIG. 5A, the indefinite noun phrase "a banana" is used more than once. In this example, the second instance of "a banana" is an error and should be replaced with "the banana". To indicate possible errors where an indefinite noun phrase is used more than once, the repeated uses of indefinite noun phrases may be annotated. In the example of FIG. 5A, the second instance of "a banana" is annotated with a dashed underline.

To further assist a user in understanding and diagnosing antecedent basis errors, the first instance of each indefinite noun phrase may also be annotated. In the example of FIG. 5A, the first instance of each indefinite noun phrase is underlined.

In some implementations, the user interface may allow a user to remove some of the annotations. For example, the user interface may include check boxes to allow a user to hide all annotations for definite noun phrases with an antecedent basis (e.g., hide green highlighting). For example, the user interface may allow any of the above annotations to be hidden.

The user interface of FIG. 5A allows a user to see the NLP results for the antecedent basis analysis, but additional techniques may be used to further assist the user in understanding and diagnosing the indicated antecedent basis errors. In some implementations, the NLP results may include executable software to allow the user to select an antecedent basis error to obtain additional information for understanding and diagnosing the error.

In FIG. 5B, a user has selected the phrase "the peeled banana" (e.g., by clicking on it). The executable software detects that the phrase was clicked, and in response, annotates other words of the claim to assist the user. In particular, the software may extract the words of the selected phrase ("peeled" and "banana") and highlight other instances of those words in the claim. For example, in FIG. 5B, the instances of the word "banana" are presented with a bold font weight. In addition, the software may annotate word variants of the words of the selected phrase. For example, the word "peeled" does not appear elsewhere in the claim, but the variant "peeling" does appear in the claim. Accordingly, the word "peeling" may also be annotated and is presented in bold in FIG. 5B.

The interactive nature of the NLP results for antecedent basis makes it easier for the user to understand the indicated antecedent basis errors. In FIG. 5B, the user can quickly see that the claim has the indefinite phrase "a banana" to provide a partial antecedent basis and that the claim has the verb "peeling". Accordingly, the user may determine that "the peeled banana" is not an antecedent basis error.

For another example, the user may select the phrase "the store". Because the claim does not contain any other instances of the word "store" (or variants of the word "store"), no other words of the claim would be annotated. The user can then quickly see that "the store" is an antecedent basis error that needs to be fixed.

In FIG. 5C, the user has selected the second instance of the indefinite noun phrase "a banana" that is indicated as an error. In response, the software can annotate other instances of the indefinite phrase to help the user diagnose the error. In the example of FIG. 5C, that other instance of "a banana" is annotated in bold. The user can thus quickly understand the error and correct it.

FIG. 6 presents an example portion of an HTML data item that may be used to present the NLP results of FIGS. 5A-C. FIG. 6 uses multiple HTML elements to present the words of a claim. An HTML element includes an opening tag (e.g., <span>), a closing tag (e.g., </span>), and the text between the opening and closing tags (including any subelements). HTML elements may also be a single tag (e.g., <br> or <br/>) but such HTML elements are not shown in FIG. 6.

The HTML elements may facilitate the presentation of the NLP results of FIGS. 5A-C. For example, each definite noun phrase with an antecedent basis may be enclosed in an HTML element that starts with <span class="ab-good"> and ends with </span>; each definite noun phrase with a partial antecedent basis may be enclosed in an HTML element that starts with <span class="ab-warning"> and ends with </span>; and each definite noun phrase without an antecedent basis may be enclosed in an HTML element that starts with <span class="ab-error"> and ends with </span>. The class of each of these elements may allow the presentation of the definite noun phrases to be annotated, such as by using the colored highlighting indicated above.

HTML elements may also be used for the presentation of indefinite noun phrases. For example, the first instance of each indefinite noun phrase may be enclosed in an HTML element that starts with <span class="indef-np"> and ends with </span>; and subsequent instances of noun phrases may be enclosed in an HTML element that starts with <span class="red-under"> and ends with </span>. The class of each of these elements may allow the presentation of the indefinite noun phrases to be annotated as indicated above.

HTML elements may also be used to facilitate the interactive features of the user interface of FIGS. 5A-C. In some implementations, HTML elements may include information about word variants by enclosing an individual word with an HTML element that includes metadata that indicates a normalized form or a base form of the word. For example, FIG. 6 includes the element '<span data-lemma="eat">eating</span>' for the word "eating". The base form of "eating" in this example is "eat" and is included in a data attribute of the HTML element. Similarly, other words in the claim, both within and outside of noun phrases may be enclosed in HTML elements to indicate the base form of the words.

In some implementations, the following JavaScript and jQuery software may be used to detect when noun phrases are selected and then bold other words in the claim that are similar to the words of the selected noun phrase:

```
$('.ab-warning, .ab-error').click(bold_noun_phrase_words);
$('.red-under').click(bold_indef_noun_phrases);
function bold_noun_phrase_words( ) {
   var noun_phrase = $(this);
   noun_phrase.find('span').each(function( ) {
      var lemma = $(this).data('lemma');
      $('#ab').find('[data-lemma="' + lemma + '"]').each(function( ) {
         $(this).css('font-weight', 900);
      });
   });
}
function normalize_text(text) {
      text = text.toLowerCase( ).replace(/\s+/g, ' ')
         .replace(/^\s+|\s+$/g,'');
      if (text.starts With('a ')) {
         text = text.slice(2);
      } else if (text.starts With('an ')) {
         text = text.slice(3);
      }
      return text;
}
function bold_indef_noun_phrases( ) {
   var noun_phrase = $(this);
   var text1 = normalize_text($(this).text( ));
   $('#ab').find('span.indef-np').each(function( ) {
      var text2 = normalize_text($(this).text( ));
      if (text1 == text2) {
         $(this).css('font-weight', 900);
      }
   });
}
```

Figure 7:
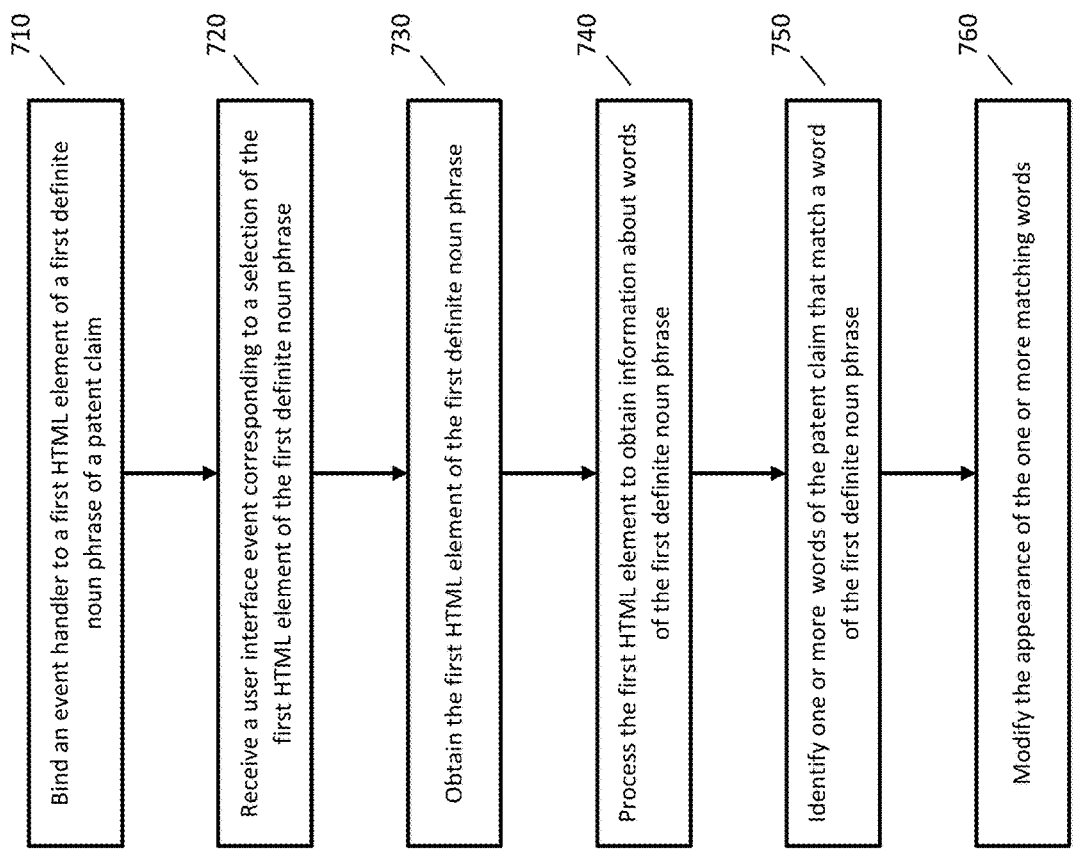
FIG. 7 is an example method for providing interactive NLP results relating to antecedent basis of a patent claim.

FIG. 7 is a flowchart of an example method for providing interactive NLP results relating to antecedent basis of a patent claim.

At step 710, an event handler is bound to a first HTML element of a first definite noun phrase of the claim. For example, a handler may be attached to the first HTML element using the software presented above. Any appropriate handler may be attached, such as a handler for a click, a double-click, or a mouse pointer moving onto the HTML element. In some implementations, handlers may be attached to HTML elements of all definite noun phrases. In some implementations, handlers may be attached to HTML elements of all definite noun phrases without an antecedent basis or with a partial antecedent basis, but may not be attached for definite noun phrases with an antecedent basis (since there may not be a need to further diagnose definite noun phrases with an antecedent basis).

The event handler may be attached using metadata of the first HTML element of the first definite noun phrase. The first HTML element may include metadata, such as in attributes of the first HTML element. Any appropriate attributes may be used to store the metadata, such as an id, a class, or a data attribute. For example, all HTML elements of definite noun phrases may include a class attribute of "definite-noun-phrase". For another example, definite noun phrases without an antecedent basis may have a class attribute of "ab-error" and definite noun phrases with a partial antecedent basis may have a class attribute of "ab-warning".

At step 720, a user-interface event is received that indicates that a user selected the first HTML element. Any appropriate event may be received, such as any representation of an HTML event (e.g., that an element was clicked). The event may be received, for example, as a JavaScript event object or a jQuery event object. The event may correspond to any appropriate action of the user, such as the user clicking, double clicking, or moving a mouse pointer over the definite noun phrase.

At step 730, the first HTML element is obtained using information from the received event. For example, the first HTML element may be obtained using the software presented above.

At step 740, the first HTML element is processed to obtain information about words of the first definite noun phrase. In some implementations, the information about the words of the noun phrase may be the text of words, and the text of words may be obtained from the HTML element (e.g., for an HTML element '<span class="ab-error">the store</span>'). In some implementations, the information about words of the first definite noun phrase may include a base form for some or all of the words of the first definite noun phrase. For example, the base form of a word may be a lemma, a stem, or a prefix.

In some implementations, information about the base form of words may be stored in metadata of the first HTML element (e.g., in attributes of the first HTML element). In some implementations, information about the base form of the words may be stored in other elements that are enclosed by the first HTML element, such as presented in FIG. 6. For example, the HTML element for "the store" may be presented as '<span class="ab-error">the <span data-lemma="store"> store</span></span>'.

Any appropriate techniques may be used to obtain the information about words of the first definite phrase, such as using the software presented above. In some implementations, information may be obtained for each word of the first definite noun phrase and, in some implementations, information may be obtained for some but not all of the words of the first definite noun phrase.

At step 750, one or more words from the patent claim (or from a different patent claim, such as a parent claim) are identified that match a word of the first definite noun phrase. The matching words may be within or outside of the first HTML element. In some implementations, a word may be a match if the text of the word is equal to text of a word within the first definite noun phrase. In some implementations, a word may be a match if the base form of the word is equal to a base form of a word of the first definite noun phrase (e.g., "peeling" and "peeled"). Words outside of the first HTML element may also be stored in HTML elements that include metadata with the base form of the word as presented in FIG. 6. Any appropriate techniques may be used to identify matching words, such as using the software presented above.

At step 760, the appearance of the one or more matching words are modified. Their appearance may be modified in any appropriate manner to bring the words to the attention of a user. For example, the word may be presented with a bold font weight. Any appropriate techniques may be used to identify a matching word, such as using the software presented above.

The process described above may be repeated for other definite noun phrases. For example, the user may select a second definite noun phrase of the claim, and then the modifications to the appearance of the matching words of the first definite noun phrase may be cleared, and matching words for the second noun phrase may be identified and their appearance modified as described above.

Similar techniques may also be applied for checking subsequent instances of an indefinite noun phrase as described in FIG. 5C above. For example, the HTML of FIG. 6 and the software presented above may be used to attach handlers to subsequent instances of indefinite noun phrases, receive a user-interface event indicating that a user selected an HTML element of a subsequent indefinite noun phrase, obtain the HTML element of the subsequent indefinite noun phrase, identify other matching indefinite noun phrases, and modify the appearance of the text of the matching indefinite noun phrases.

NLP results may also be used to proofread other aspects of a patent claim. FIGS. 8A-B present example user interfaces that provide interactive NLP results relating to word support of a patent claim and that may be presented in the Word Support tab of FIG. 3.

FIG. 8A presents the same example patent claim presented above. In FIG. 8A, words of the claim are annotated to help the user understand the support of individual claim words in the specification. In a patent claim, it may be desired that words of the claim be used a sufficient number of times in the specification so that there is sufficient clarity regarding the meaning of the words in the claim and to ensure that the specification fully describes the claim.

In FIG. 8A, words are annotated to indicate a count of the number of times the word appears in the specification. In some implementations, the count may be for exact matches, and in some implementations, the count may include word variations (e.g., using base forms of words as described above). In this example, the words are annotated with highlighting (indicated as a box), and the color of the highlighting indicates how much support the word has. For example, words with a count greater than 5 may be highlighted in green, words with a count from 1 to 5 may be highlighted in yellow, and words with a count of 0 may be highlighted in red. In some implementations, some words deemed unimportant (e.g., prepositions) may not be highlighted.

The NLP results may include interactive features to allow a user to view additional information for each highlighted word. In some implementations, a user may select a word (e.g., by clicking it or hovering the mouse pointer over it) and additional information may be presented about the count of the number of times the word appears in the specification. For example, a tooltip box may be presented as shown in FIG. 8A. The additional information may include any appropriate information, such as the total count for the word or a count for each variation of the word that appears in the specification, as shown in FIG. 8A.

In some implementations, the interactive features may allow a user to view how a word in the claim (and/or variants of the word) was used in the specification. A user may select a word (e.g., by clicking or double clicking the word), and paragraphs (or other portions, such as a sentence or multiple sentences) from the specification may be presented to allow the user to quickly see how the word was used in the specification. For example, FIG. 8B is a dialog box that shows paragraphs in the specification that use the word "banana". The instances of the word banana may be annotated (e.g., with underline or highlighting) to allow the user to quickly see where the word was used in the paragraph. In this example, the word banana appears in 7 paragraphs and arrows are provided to allow the user to navigate to the other paragraphs that use the word banana.

FIG. 9 presents an example HTML data item for providing interactive NLP results relating to word support of a patent claim that may be used to present the NLP results of FIGS. 8A-B. The HTML elements in FIG. 9 may facilitate the presentation of the NLP results. For example, each word with a first level of support (e.g., a count greater than 5) may be enclosed in an HTML element that starts with <span class="support-good"> and ends with </span>; each word with a second level of support (e.g., a count from 1 to 5) may be enclosed in an HTML element that starts with <span class="support-warning"> and ends with </span>; and each word with a third level of support (e.g., a count of 0) may be enclosed in an HTML element that starts with <span class="support-error"> and ends with </span>. The class of each of these elements may allow the presentation of the words to be annotated, such as by using the colored highlighting indicated above.

HTML elements may also be used to provide interactive information about the counts of each word. For example, an HTML element enclosing a word may include metadata that includes the information about the counts. Any appropriate metadata may be used, such as an attribute of the HTML element. In the example of FIG. 9, the count information is stored in a title attribute. For example, the following is the HTML element for an instance of the word "eating": <span data-toggle="tooltip" title="eating: 10<br>eats: 6<br>eats: 2" class="support-good">eating</span>. This HTML element may also be used to provide interactive information about the paragraphs of the specification that include the words of the claims. For example, the word variants may be obtained from metadata of the HTML element, and the word variants may be used to obtain paragraphs that include the word variants.

In some implementations, the following JavaScript and jQuery software may be used to detect when words are selected and then provide information about counts for the word or present paragraphs that include the word:

```
$('[data-toggle="tooltip"]').tooltip({html: true});
$('#word-support .support-good').dblclick(show_word_dlg);
$('#word-support .support-warning').dblclick(show_word_dlg);
function show_word_dlg( ) {
    var tooltip_title = $(this).data('original-title');
    var word_re = /(?:^|>)(.*?):/ig;
    var m;
    var words = [ ];
    while (m = word_re.exec(tooltip_title))
        words.push(m[1]);
    pars_re = new RegExp('\\b(' + words.join('|') + ')\\b', 'ig');
    pars = $('#app p').filter(function( ) {
```

-continued

```
    pars_re.lastIndex = 0;
    return pars_re.test($(this).text( ));
  });
  // Code to show dialog
  ...
}
```

Figure 10:
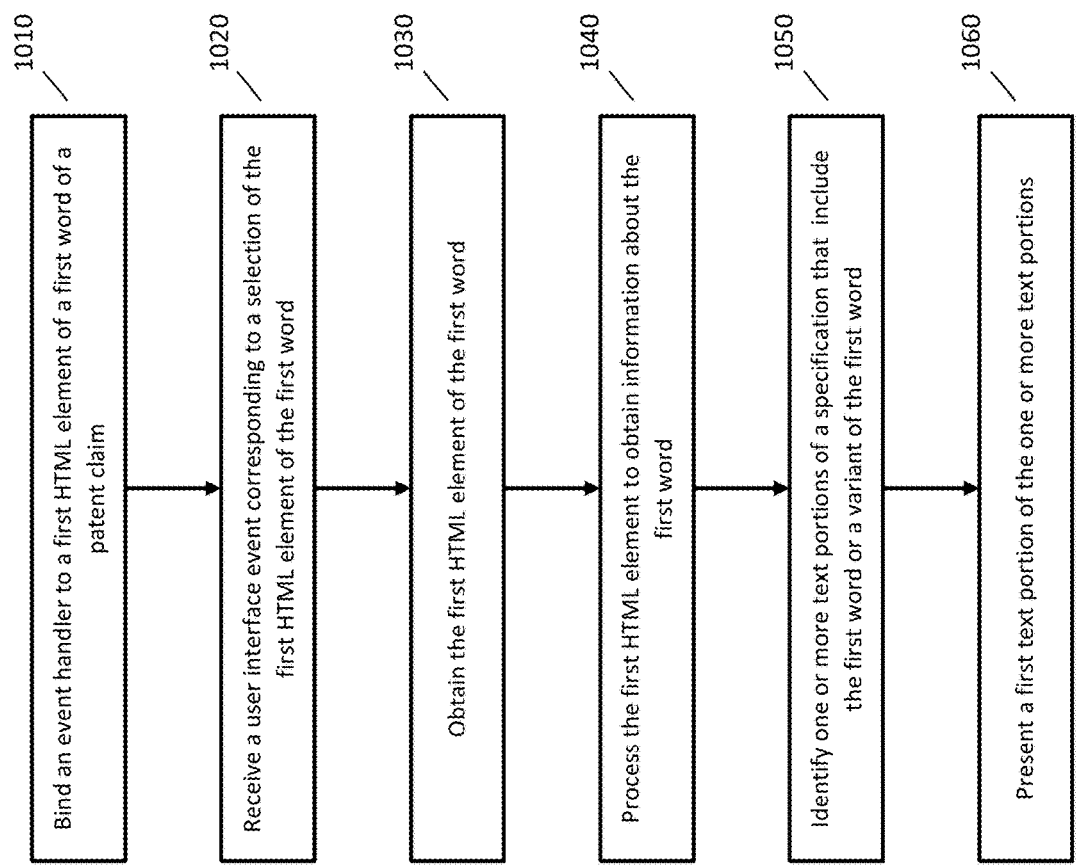
FIG. 10 is an example method for providing interactive NLP results relating to word support of a patent claim.

FIG. 10 is a flowchart of an example method for providing interactive NLP results relating to word support of a patent claim.

At step 1010, an event handler is bound to a first HTML element of a first word of the claim. For example, a handler may be attached to the first HTML element using the software presented above. Any appropriate handler may be attached, such as a handler for a click, a double-click, or a mouse pointer moving onto the HTML element. In some implementations, handlers may be attached to HTML elements of all words. In some implementations, handlers may be attached to HTML elements of some but not all words of a claim (e.g., words deemed unimportant or words without any support and thus for which additional information may not be available). Any of the techniques described above may be used to bind the event handler.

At step 1020, a user-interface event is received that indicates that a user selected the first HTML element. Any appropriate event may be received (e.g., that an element was clicked). The event may be received, for example, as a JavaScript event object or a jQuery event object. The event may correspond to any appropriate action of the user, such as the user clicking, double clicking, or moving a mouse pointer over the definite noun phrase.

At step 1030, the first HTML element is obtained using information from the received event. For example, the first HTML element may be obtained using the software presented above.

At step 1040, the first HTML element is processed to obtain information about the first word. In some implementations, the information about the first word may be the text of word, and the text of the word may be obtained from the HTML element (e.g., for an HTML element '<span>the store</span>'). In some implementations, the information about the first word may include a base form of the word or one or more variants of the word.

In some implementations, information about the word may be stored in metadata of the first HTML element (e.g., in attributes of the first HTML element). For example, word variants for "eating" may be stored in metadata as '<span title="eating: 10<br>eats: 6<br>eats: 2">eating</span>' or a base form of "eating" may be stored as '<span data-lemma="eat">eating</span>'. Any appropriate techniques may be used to obtain the information about the first word, such as using the software presented above.

At step 1050, one or more text portions of a patent application specification that include the first word or a variant of the first word are identified. In some implementations, where the information about the first word includes the base form of the first word, matching words in the document may be identified as described above, and one or more portions of the specification may be obtained that include the matching word (e.g., the paragraph containing the word). In some implementations, where the information about the first word includes variants of the first word, the specification may be searched to find the variants of the first word. For example, the search may be performed using regular expressions as shown in the software above.

In some implementations, the search for the first word (and variants) may be performed in the same HTML data item that is presenting the user interface for viewing the word support of the claim. For example, the user interface for word support may be presented in the Word Support tab of FIG. 3, and the patent specification may be presented in the Spec tab of FIG. 3. Because the specification is included in the HTML data item that is already present on the user's computer, the specification may be searched in an offline manner, such as by using the software presented above. In some implementations, the specification may be included in the HTML data item but may not be visible to the user. For example, the specification may be enclosed in an HTML element that is not displayed.

At step 1060, a first text portion of the one or more text portions is presented to a user. The first text portion may be presented using any appropriate techniques. For example, the first text portion may be presented in a dialog box, such as the dialog box of FIG. 8B. The user may then use the controls of the dialog box to view other paragraphs of the specification that include the first word or variants of the first word.

The process described above may be repeated for other words of the claim. For example, the user may dismiss the dialog and then select a second word of the claim. Text portions of the specification that include the second word or a variant of the second word may be identified, and a text portion may be presented to the user.

In some implementations, interactive, offline NLP results may be implemented as described in the following clauses, combinations of the following clauses, or in combination with other techniques described herein.

Clause 1. A computer-implemented method, comprising: providing first data comprising hypertext markup language (HTML), wherein the first data comprises: text of a first patent claim, a first HTML element that encloses a first word of the first patent claim, wherein the first HTML element includes first metadata indicating a first level of support for the first word, a second HTML element that encloses a second word of the first patent claim, wherein the first HTML element includes second metadata indicating a second level of support for the second word; and providing second data comprising computer-executable instructions that, when executed, cause at least one processor to perform actions comprising: binding an event handler to the first HTML element, receiving a user-interface event corresponding to a selection of the first HTML element, obtaining the first HTML element using the user-interface event, processing the first HTML element to obtain information about the first word, obtaining text of a first portion of a document using the information about the first word, wherein the text of the first portion comprises the first word or a variant of the first word, and causing the text of the first portion to be displayed to a user.

Clause 2. The computer-implemented method of clause 1, wherein the information about the first word comprises a base form of the first word or one or more variants of the first word.

Clause 3. The computer-implemented method of clause 1, wherein the first HTML element stores the information about the first word in third metadata.

Clause 4. The computer-implemented method of clause 3, wherein the third metadata comprises a title attribute of the first HTML element.

Clause 5. The computer-implemented method of clause 1, wherein the first metadata causes presentation of the first word using a first color and the second metadata causes presentation of the second word using a second color, and wherein the first color is different from the second color.

Clause 6. The computer-implemented method of clause 1, wherein the user-interface event corresponds to a click or double click of the first HTML element.

Clause 7. The computer-implemented method of clause 1, wherein causing the text of the first portion to be displayed comprises causing a dialog box to be displayed.

Clause 8. The computer-implemented method of clause 7, wherein the dialog box includes controls for viewing other paragraphs comprising the first word or a variant of the first word.

Clause 9. The computer-implemented method of clause 1, wherein the first portion is a paragraph of a patent application.

Clause 10. The computer-implemented method of clause 9, wherein obtaining the text of the first portion comprises using a regular expression.

Clause 11. The computer-implemented method of clause 1, wherein: the first data comprises the text of the first patent claim in a first tab; and the text of the first portion in a second tab.

Clause 12. The computer-implemented method of clause 1, wherein the first HTML element includes metadata indicating (i) a first variant of the first word, (ii) a count for the first variant of the first word, (iii) a second variant of the first word, and (iv) a count for the second variant of the first word.

Clause 13. The computer-implemented method of clause 12, wherein the computer-executable instructions cause the at least one processor to perform actions comprising: binding a second event handler to the first HTML element, receiving a second user-interface event corresponding to a selection of the first HTML element and the second event handler, causing count information to be displayed relating to (i) the first variant of the first word, (ii) the count for the first variant of the first word, (iii) the second variant of the first word, and (iv) the count for the second variant of the first word.

Clause 14. The computer-implemented method of clause 13, wherein the count for the first variant of the first word is a number of times that the first variant of the first word appears in a specification of a patent application.

Clause 15. The computer-implemented method of clause 14, wherein the second user-interface event corresponds to a mouse hovering over the first HTML element.

Clause 16. The computer-implemented method of clause 14, wherein causing the count information to be displayed comprises presenting a tooltip.

Clause 17. A computer-implemented method, comprising: receiving first data comprising hypertext markup language (HTML), wherein the first data comprises: text of a first patent claim, a first HTML element that encloses a first word of the first patent claim, wherein the first HTML element includes first metadata indicating a first level of support for the first word, a second HTML element that encloses a second word of the first patent claim, wherein the first HTML element includes second metadata indicating a second level of support for the second word; binding an event handler to the first HTML element; receiving a user-interface event corresponding to a selection of the first HTML element; obtaining the first HTML element using the user-interface event; processing the first HTML element to obtain information about the first word; obtaining text of a first portion of a document using the information about the first word, wherein the text of the first portion comprises the first word or a variant of the first word; and causing the text of the first portion to be displayed to a user.

Similar techniques may also be applied for checking the support of phrases in the claims. An event handler may be bound to an HTML element that encloses a phrase of the patent claim, a user-interface event may be received corresponding to the selection of the HTML element, the HTML element may be obtained from the event, the HTML element may be processed to obtain information about the phrase (e.g., the text of the phrase), one or more text portions of the specification may be obtained that include the phrase, and a text portion may be presented to the user.

NLP results may also be used to proofread other aspects of a patent application. FIGS. 11A-B are example user interfaces that provide interactive NLP results relating to reference labels of a patent application and that may be presented in the Ref Labels tab of FIG. 3.

Patent applications may include reference labels for clarity of presentation. A reference label may be assigned, for example, to a thing, a part, or a step of a method, and the reference label may be used in the drawings and in the text of the specification.

FIG. 11A is an example user interface for presenting errors that may occur with reference labels. In FIG. 11A, the first column shows the reference label, the second column provides information about how the reference label was used in the specification, and the third column provides information about how the reference label was used in the drawings.

For example, reference label 100 was used with the word "banana" 37 times, was used with the phrase "peeled bananas" 5 times, was used in one instance without text before it, and appeared in drawing figure numbers 1, 3, and 4. Reference label 100 may be flagged as a warning since it was used with more than phrase or because it was used in an instance without text. Reference label 100 may not be flagged as an error because "banana" and "peeled bananas" are similar to each other, and such use of the reference label may not be considered inconsistent.

Reference label 110 was used with the word "display" 3 times and appeared in drawing figure number 1. Reference label 110 may be flagged as no error since it was used with a single phrase and appears in both the specification and the drawings.

Reference label 120 was used with the phrase "commercial establishment" 5 times, was used with the word "banana" once, and appeared in drawings figure number 2. Reference label 120 may be flagged as an error since it was used with phrases that are not similar to each other.

Reference label 130 was used with the word "apple" once and does not appear in the drawings. Reference label 130 may be flagged as an error since it does not appear in the drawings.

Reference label 140 was used in the drawings and does not appear in the specification. Reference label 140 may be flagged as an error since it does not appear in the specification.

The cells of the table may be annotated (e.g., using metadata on an element, such as a class attribute) to facilitate presentation of whether there is no error, a warning, or an error. For example, where there is an error (e.g., specification column of label 120, drawings column of label 130, and specification column of label 140), the background of a cell may displayed as red; where there is a warning (e.g., the specification column of reference label 100), the background of a cell may be displayed as yellow, and where there is no error or warning, the background of the cell may be presented as green.

The NLP results may also include interactive features to allow a user to better understand the errors and warnings. In some implementations, a user may click on the first or second column for a reference label to see text portions of the specification where the reference label was used. For example, where a user selects a first column for a reference label (e.g., the reference label itself), text portions may be shown where the reference label was used. For another example, where a user selects text of the second column of a reference label (e.g., the word "display" for reference label 110), text portions may be shown where the reference label was used with the selected text.

FIG. 11B illustrates an example dialog that may be shown after a user selects the text "display" of reference label 110. The dialog indicates that 2 paragraphs include the text "display 100", presents a first paraph, and also presents controls to allow the user to see the other paragraph.

FIG. 12 is an example HTML data item for providing interactive NLP results relating to reference labels of a patent application and that may be used to present the NLP results of FIGS. 11A-B. The HTML elements in FIG. 12 may facilitate the presentation of the NLP results. For example, the HTML element for a cell without an error or warning may include metadata such as 'class="rl-good"'; the HTML element for a cell with a warning may include metadata such as 'class="rl-warning"'; and the HTML element for a cell with an error may include metadata such as 'class="rl-error"'. The class of each of these elements may allow the presentation of the reference labels to be annotated, such as by using the background colors indicated above.

The reference labels or the phrases of the specification column may also be enclosed by an HTML element with metadata to facilitate selection of the reference label or phrase for displaying additional information, such as the information presented in the dialog box of FIG. 11B. For example, the phrase "peeled bananas" may be enclosed in the following HTML element: <span data-label="peeled bananas">peeled bananas</span>.

In some implementations, the following software may be used to detect when a reference label or text of a reference label is selected to present portions of the specification that use the reference label and/or phrase:

```
$('td.label-num').dblclick(show_label_dlg);
$(' td.label-text span').dblclick(show_label_text_dlg);
function show_label_dlg( ) {
    search_term = $(this).text( );
    pars_re = new RegExp('\\b(' + search_term + ')\\b', 'ig');
    pars = $('#app p').filter(function( ) {
        pars_re.lastIndex = 0;
        return pars_re.test($(this).text( ));
    });
    // Code to show dialog
    ...
}
function show_label_text_dlg( ) {
    var ref_text = $(this).data('label');
    var tr = $(this).parent( ).parent( );
    var td = tr.find('td.label-num');
    var ref_label = td.text( );
    if (ref_text === '') {
        search_term = ref_label;
    } else {
        search_term = ref_text + ' ' + ref_label;
    }
    pars_re = new RegExp('\\b(' + search_term + ')\\b', 'ig');
    pars = $('#app p').filter(function( ) {
        pars_re.lastIndex = 0;
        return pars_re.test($(this).text( ));
    });
});
    // Code to show dialog
    ...
}
```

A method for showing text portions of the specification corresponding to a reference label or a combination of a reference label and a phrase may be implemented using techniques similar to FIG. 10. A first event handler may be bound to an HTML element of a reference label to allow a reference label to be selected, a second event handler may be bound to an HTML element for a phrase of a reference label, a user-interface event may be received corresponding to selection of a reference label or a phrase of a reference label, the HTML element corresponding to the event may be obtained, the HTML element may be processed to obtain information for identifying matching text portions of the specification, one or more text portions may be identified in the document (e.g., using regular expressions), and a first text portion may be presented to the user.

The process described above may be repeated for other reference labels and/or text phrases. For example, the user may dismiss the dialog and then select another reference label or phrase. Text portions of the document for the selection may be identified, and a text portion may be presented to the user.

Figure 13:
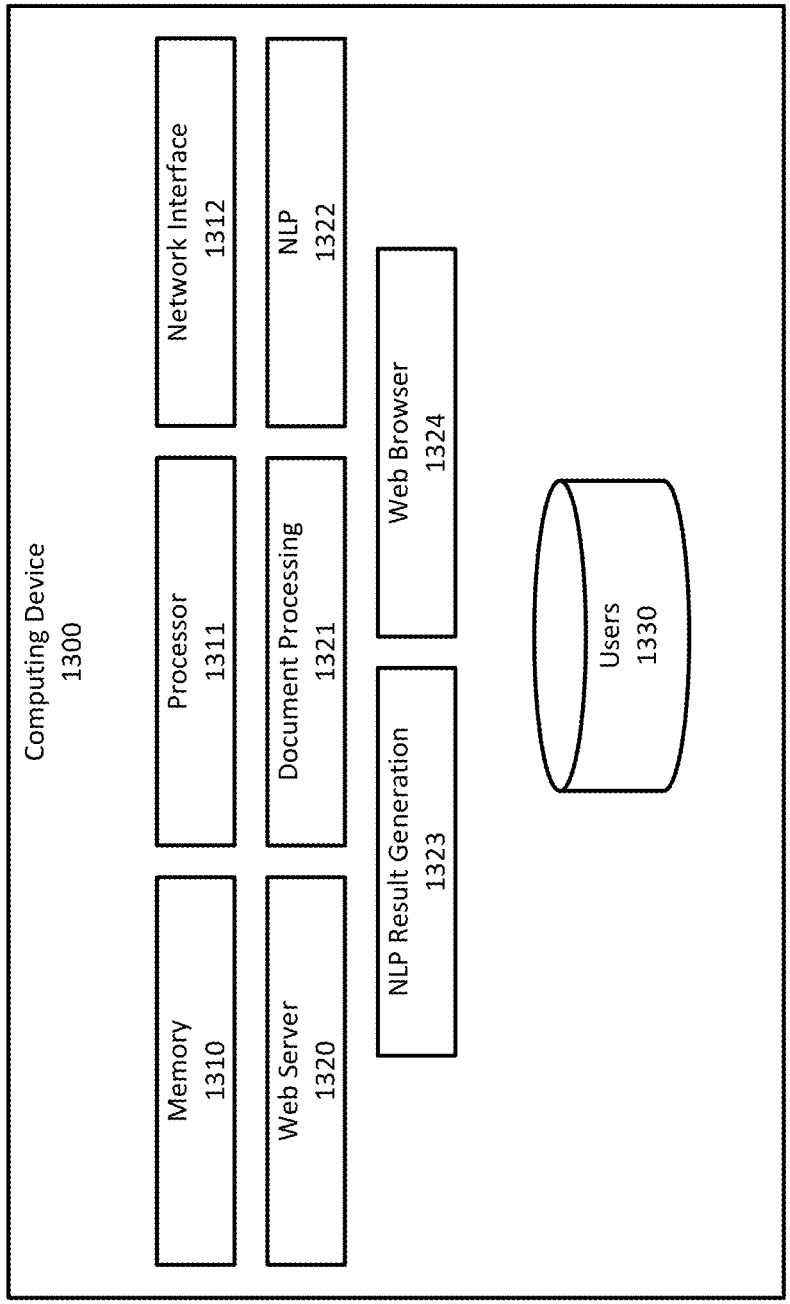
FIG. 13 is an example device for providing interactive NLP results.

FIG. 13 illustrates components of one implementation of a computing device 1300 for implementing any of the techniques described above. In FIG. 13, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1300 may include any components typical of a computing device, such as volatile or non-volatile memory 1310, one or more processors 1311, and one or more network interfaces 1312. Computing device 1300 may also include any input and output components, such as displays, keyboards, and touch screens. Computing device 1300 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1300 may have web server component 1320 that may perform any appropriate techniques for receiving hypertext transfer protocol requests and providing responses, such as responding to a post of a form of a web page, using any appropriate techniques. Computing device 1300 may have document processing component 1321 that may parse a submitted document (e.g., PDF, Microsoft Word, PowerPoint, or Visio) to obtain text and other information from the document using any appropriate techniques. Computing device 1300 may have natural language processing component 1322 that may perform any of the NLP tasks described herein using any appropriate techniques. Computing device 1300 may have NLP result generation component 1323 that may generate interactive NLP results using any appropriate techniques, such as by using any of the techniques described herein. Computing device 1300 may have web browser component 1324 that may process data items (e.g., HTML and JavaScript) to present interactive NLP processing results, such as by using any of the techniques described herein.

Computing device 1300 may include or have access to various data stores. Data stores may use any known storage technology such as files, relational databases, non-relational databases, or any non-transitory computer-readable media. Computing device 1300 may have users data store 1330 that may be used to store authentication credentials of users to allow them to login and submit NLP processing requests using any appropriate techniques.

Patent Drafting Assistance Tools

Tools may also be created to assist a person with drafting a patent application. The tools described above may also be integrated into a word processing application (e.g., Microsoft Word or Google Docs) and the proofreading results may be presented alongside the document being edited, such as in a panel that is presented next to the contents of the document being edited. For example, proofreading may be automated such that the contents of the document are processed periodically (e.g., every minute) or after a threshold amount of editing to the document (e.g., a number of characters typed) and the updated proofreading results may be presented to the user while the user is editing the document.

In some implementations, the proofreading results may be able to change the appearance of the document being edited or control the word processing software to present a particular portion of the document. For example, for the antecedent basis error results of FIGS. 5A-C, a user may select on a highlighted portion, and executable software running in the word processing program (e.g., a JavaScript add-in) may cause the word processing program to scroll to present the portion of the claim corresponding to the highlight selected by the user. For another example, the portion of the claim in the document being edited may be annotated, such as by adding highlighting.

In some implementations, other tools for assisting a patent attorney in drafting patent applications may be provided. For example, a tool may be provided to assist the patent attorney in keeping track of reference labels used in a patent application. A patent application may have a large number of reference labels and the drafter may accidentally use the wrong reference label or spend time trying to find or remember the reference label that is needed.

As the drafter is writing the patent application, the reference labels may be identified. For example, when the drafter enters "the customer may buy banana 100", the number "100" may be identified as a reference label, and the word "banana" may be identified as the phrase that corresponds to the reference label.

Any appropriate techniques may be used to identify reference labels. For example, reference labels may be presumed to follow a particular format (e.g., at least two digits and optionally followed by one or more characters) and the reference labels may be identified using regular expressions.

In some implementations, text of the document may be processed as it is being entered and reference labels identified from the newly entered text. In some implementations, the entire document may be scanned periodically (e.g., every 10 seconds) to identify new reference labels present in the document.

Text before an identified reference label may be processed to determine the phrase that corresponds to the reference label. In some implementations, NLP techniques may be used to process the text before the reference label to identify a noun or noun phrase that precedes the reference label. The NLP techniques may be implemented locally (e.g., within the word processing application), remotely using cloud processing, or a combination of the two.

A data structure may be maintained with the reference labels found in the document. The data structure may include a field for the reference label and a field for the phrases associated with the reference label (there may be more than one since a reference label may appear multiple times in the document). This information in the data structure may be presented to the user in the word processing application as a table so that the drafter has easy access to the reference labels that appear in the document. For example, the table may use any of the techniques described above for FIG. 11A and may be color coded to indicate errors and warnings.

In some instances, a number may be identified as a reference label that is not actually a reference label. For example, for the text "the person has age 24", the number 24 may be identified as a reference label and the word "age" as the phrase corresponding to the reference label. The drafter may desire to remove such mistakes from the table, and a user interface may be provided to allow the drafter to do so. For example, a button may be presented for each row, and when the drafter selects a button, the corresponding reference label may be hidden from view or moved to the bottom of the table. The data structure of reference labels may include a field to indicate that the corresponding number is not a reference label so that the number is not later recognized as a reference label.

In some implementations, the drafter may edit the phrase corresponding to the reference label. For example, the phrase for reference label 100 may be "yellow banana" and the drafter may prefer that the reference label be associated with "banana". The user interface may allow the drafter to edit the phrase associated with a reference label using any appropriate techniques.

To identify the noun phrases that come before reference labels, NLP processing could be performed on the entire document. Where cloud processing is used to identify reference labels and phrases, additional techniques may be used to reduce the amount of needed cloud processing (to increase speed of processing and also reduce costs). To reduce the amount of NLP processing, for each instance of a reference label, a text portion may be extracted from the document where the text portion precedes the reference label. For example, the text portion may be from the beginning of the sentence to the reference label or from a previous punctuation mark (e.g., comma or semi-colon) to the reference label. Such a text portion would likely include the noun phrase that appears before the reference label without too much additional text. Performing NLP processing on the text portions instead of the entire document may significantly reduce the amount of cloud processing for identifying noun phrases corresponding to reference labels.

The data structure of reference labels may also include the text portion for each instance of a reference label in the document. As the document is edited, a text portion corresponding to a reference label may be edited, and the text portion may be updated in the data structure. Where a text portion is modified, NLP processing may be performed on the updated text portion to determine if the noun phrase associated with the reference label has changed. Where a text portion has not been changed, NLP processing may not be needed for the text portion.

Figure 14:
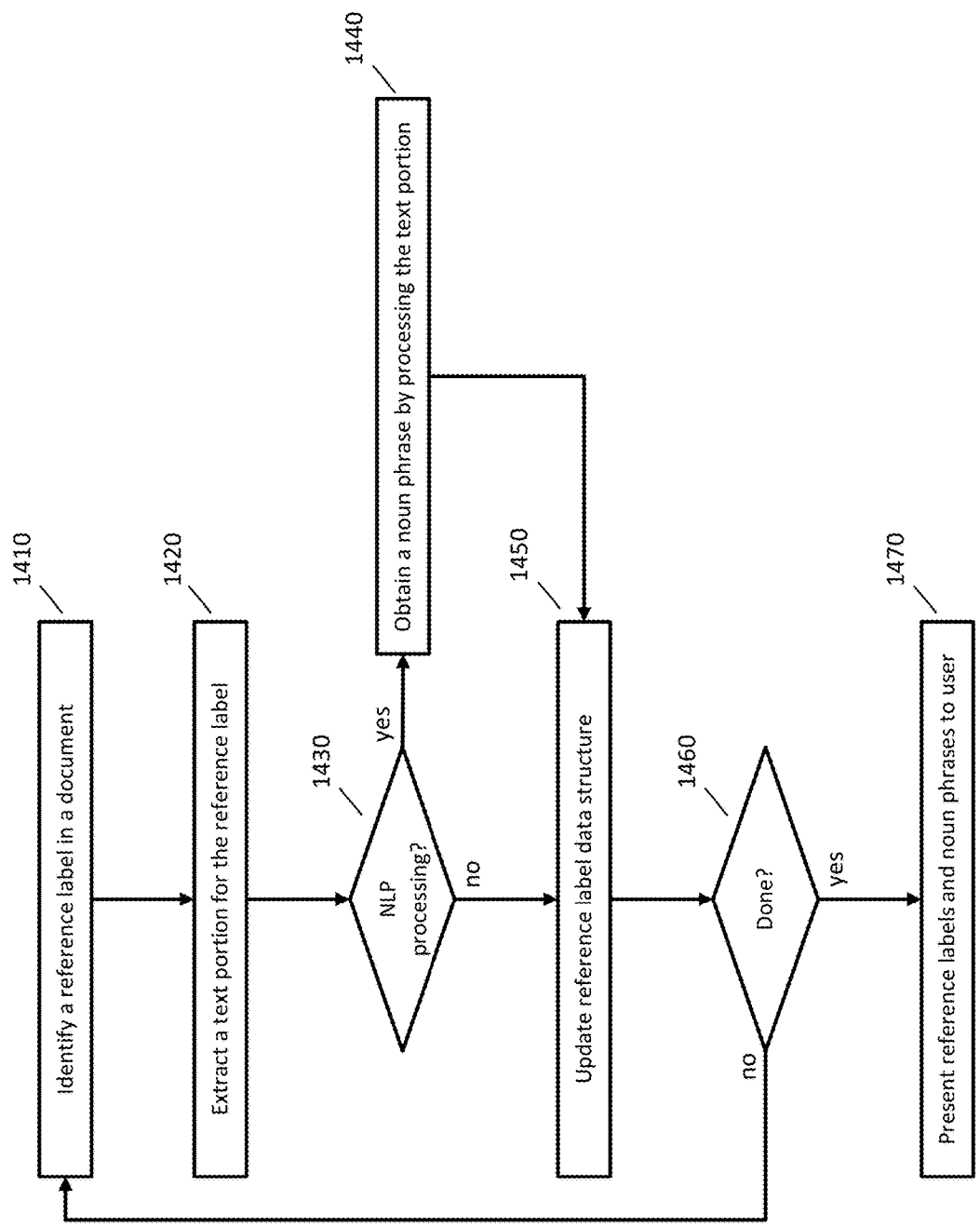
FIG. 14 is an example method for assisting a drafter in keeping track of reference labels in a document.

FIG. 14 is a flowchart of an example method for assisting a drafter in keeping track of reference labels in a document.

At step 1410, a reference label is identified in a document. Any appropriate techniques may be used to identify a reference label, such as using regular expressions. In some implementations, the reference label may be identified by processing the entire text of the document in order and sequentially finding reference labels. In some implementations, the reference label may be obtained by processing a portion of the document that was recently changed, such as a paragraph that had text added or removed.

At step 1420, a text portion is obtained for the reference label. In some implementations, the text portion may be text that occurs immediately before the reference label. For example, the text portion may include text from the beginning of a paragraph or sentence to the reference label or from a punctuation mark (e.g., a period, comma, or semi-colon) before the reference label to the reference label.

At step 1430, it is decided whether to perform NLP processing on the text portion to obtain a phrase that corresponds to the reference label. Any appropriate techniques may be used to determine whether to perform NLP processing. In some implementations, a rule-based approach may be used that applies rules for an existing reference label data structure. For example, one or more of the following rules may be used: (i) if the reference label and text portion are already in the data structure, do not perform NLP processing, (ii) if the reference label is not in the data structure, perform NLP processing, or (iii) if the text portion is not in the data structure, perform NLP processing. If it is decided to perform NLP processing, then the method proceeds to step 1440, and if it is decided not to perform NLP processing, then the method proceeds to step 1450.

At step 1440, a noun phrase is obtained by processing the text portion. In some implementations, a part of speech may be assigned to each word or token in the text portion. In some implementations, the text portion may be parsed to assign a dependency label and head for each word or token in the text portion. A noun phrase may then be selected that is adjacent to or closest to the reference label (e.g., closest to the end of the text portion). In some implementations, at least a portion of the processing of step 1440 may be performed using cloud NLP services. For example, an API call may be made to a server computer that includes the text portion, and the API call may return any of the information described above (e.g., part of speech, dependency label, noun phrase, etc.).

At step 1450, the reference label data structure is updated using the reference label, text portion, and the noun phrase if it was determined at step 1440. Any appropriate techniques may be used to update the data structure. For example, if the reference label is not in the data structure, then a new entry may be created for the reference label. If an entry exists for the reference label, then the text portion and noun phrase may be added to the entry. Any other appropriate information may be added to the reference label data structure, such as information indicating a location in the document (e.g., a paragraph or line number) where the reference label appears or a date and time of the update. In some instances, the data structure may not be updated, such as when step 1440 was not performed.

At step 1460, it is determined whether additional portions of the document remain to be processed. For example, where the entire document is being processed, then the method may continue with the text of the document after the reference label that was identified at step 1410. Where changes to the document are being processed, then the method may continue with the text of the changed portion after the reference label that was identified at step 1410. Where additional portions of the document remain to be processed, then the method continues to step 1410. Where no more portions remain to be processed, then the method continues to step 1470.

At step 1470, the reference labels and corresponding phrases are presented to a user, such as in a panel that is presented next to the text of the document. The reference labels and corresponding phrases may be presented using any appropriate techniques, such as the techniques described herein.

After step 1470, the method may be repeated and start again at step 1410. In some implementations, the method may be continuously performed while the drafter is editing the document. For example, the method may be performed at fixed intervals of time or after a threshold number of changes to the document.

Other variations of the above are possible. For example, all of the reference labels may be identified at once instead of identifying reference labels one at a time. For another example, text portions may be extracted for each reference label before determining whether to perform NLP processing. For another example, the presentation of the reference labels to the user may be updated as each reference label is processed (e.g., after step 1450).

Patent Examiner Grant Rate

Patent practitioners (e.g., patent attorneys and patent agents) may use statistics about patent examiners to better understand their chances of obtaining an issued patent and also to improve prosecution strategy. A commonly used statistic is a grant rate or allowance rate of an examiner. For an examiner's cases over a period of time (or all of the examiner's cases), a grant rate may be the percentage of disposed applications (applications that were granted or abandoned) that are granted. For example, a grant rate may be computed as n_granted/(n_granted+n_abandoned) where n_granted is the number granted during the time period and n_abandoned is the number abandoned during the time period. This grant rate summarizes what has happened over a previous time period and will be referred to as a backward grant rate.

Figure 15A:
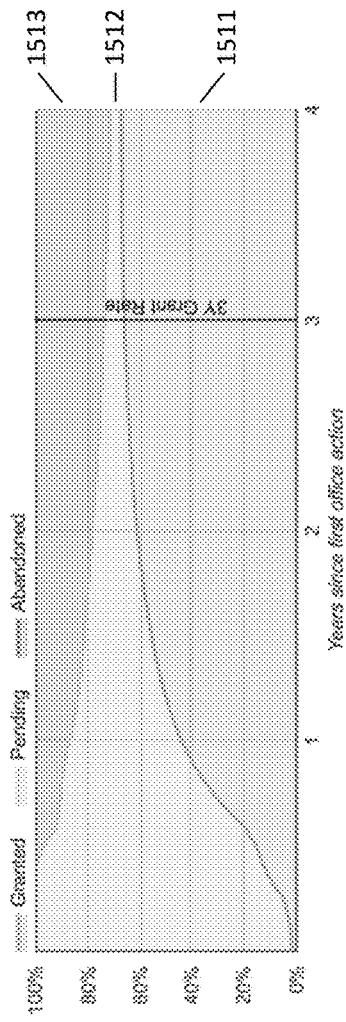
FIGS. 15A-F are example grant rate timelines.

Instead of looking backward in time, a grant rate timeline may be constructed that predicts patent outcomes over time from a starting date, such as a filing date or the date of a first office action. FIG. 15A is an example grant rate timeline for the entire USPTO. In this timeline, the starting date is the date of the first office action and the time line continues for 4 years after the date of the first office action. The bottom portion 1511 is the percentage of applications that are granted and this increases from about 0% to about 67% after 4 years. The top portion 1513 is the percentage of applications that are abandoned and this increases from about 0% to about 28% after 4 years. The middle portion 1512 is the percentage of applications that are pending and this decreases from about 100% to about 5% after 4 years. Each point along the timeline provides an estimate of your patent status at that time. For example, you have a 44% chance of being granted a patent by one year after the first office action, a 61% chance after two years, a 66% chance after three years, and so forth.

In some implementations, a grant rate timeline may start with the filing date of an application instead of the date of the first office action. In this scenario, the grant and abandonment rates would be close to 0% for the first 12-18 months until the examiner issues a first office action.

To construct this timeline, take all the patent applications of the USPTO and shift them in time so that the dates of their first office actions are the same. Then, for each month afterwards, compute the percentage of patent applications that were granted, still pending, or abandoned by that month. As time goes on, the percentage of patent applications that are granted or abandoned generally increases.

Figure 15B:
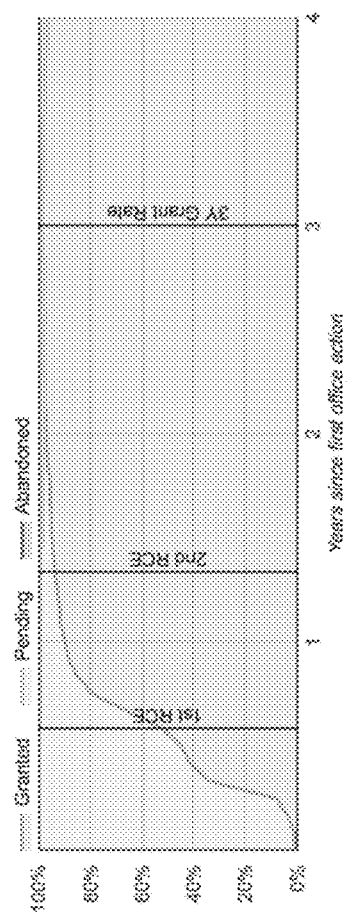
Figure 15C:
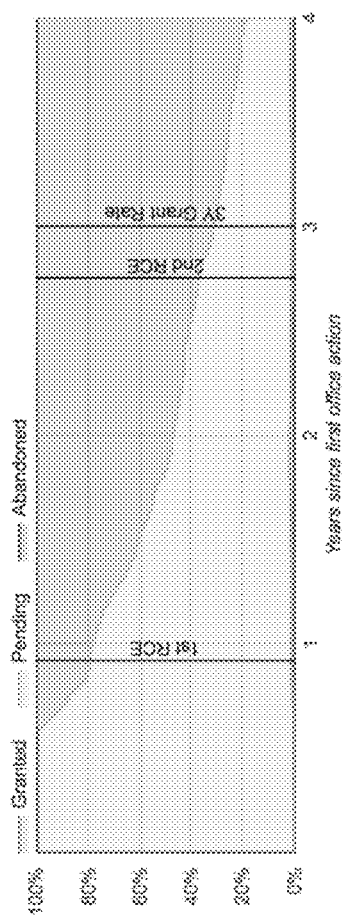

Examiners in the USPTO may have very different grant rates. For comparison, we present timelines for two examiners with very different grant rates. In FIG. 15B, Examiner DT, has a very high grant rate with 90%, 97%, and 98% of applications granted at one, two, and three years after the first office action, respectively. By contrast, in FIG. 15C, Examiner SP has a very low grant rate with only 1% of applications granted at three years after the first office action.

To compare patent examiners, it may be easier to use a single number rather than an entire timeline. One metric for comparing examiners is a point on the timeline, such as at three years, which may be referred to as a three-year grant rate. A three-year grant rate, for example, may provide a balance between providing enough time for meaningful prosecution and obtaining a relatively near-term measure.

Figure 16:
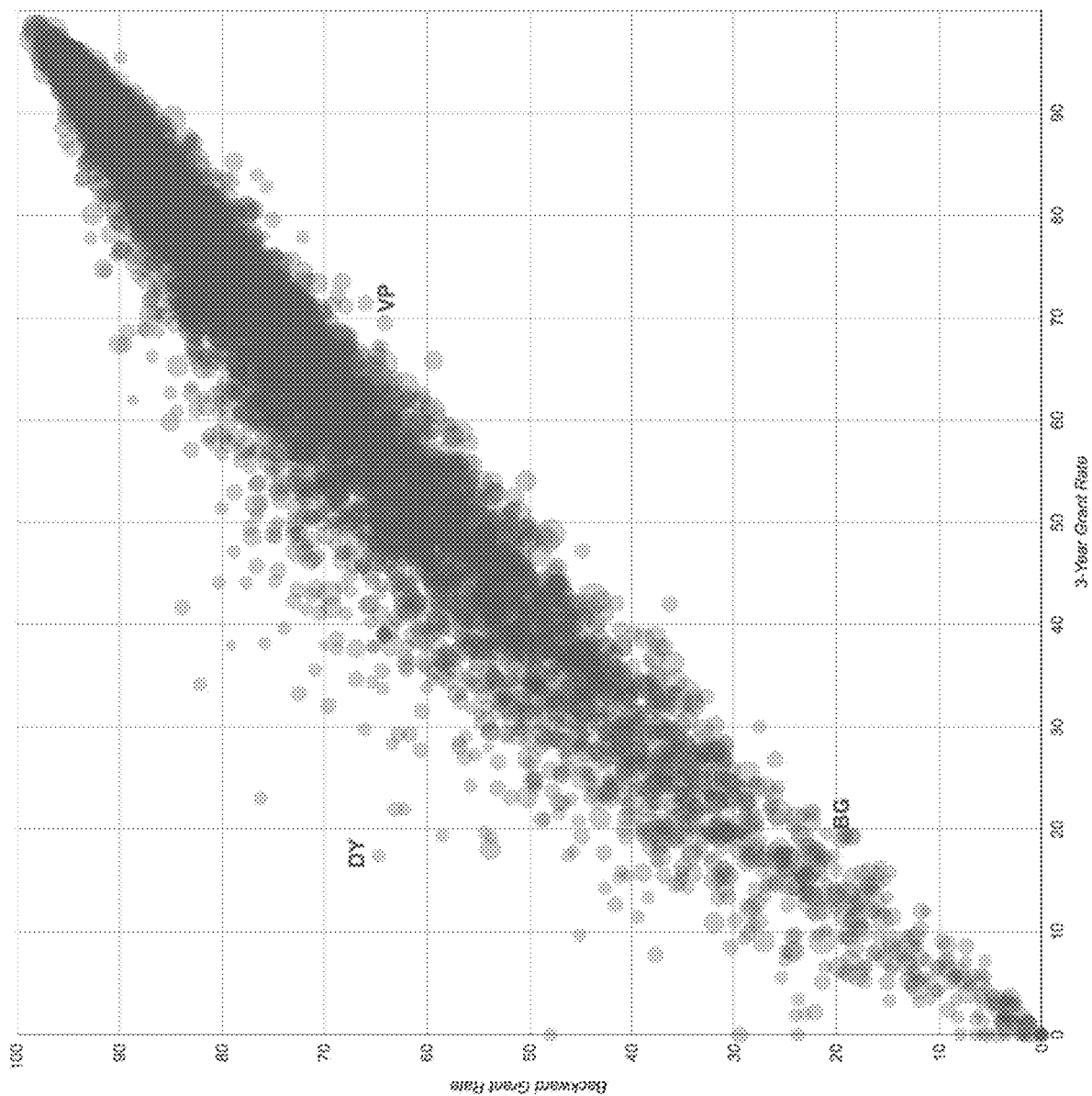
FIG. 16 is a scatter plot comparing the three-year grant rate with the backward grant rate.

To compare the three-year grant rate with the backwards grant rate, FIG. 16 illustrates a scatter plot of examiners with the backward grant rate on the vertical axis and the 3-year grant rate on the horizontal axis (SPEs and examiners with a small number of cases have been excluded). The two grant rates are highly correlated with each other with the backward grant rate being, on average, a little higher than the three-year grant rate.

Figure 15D:
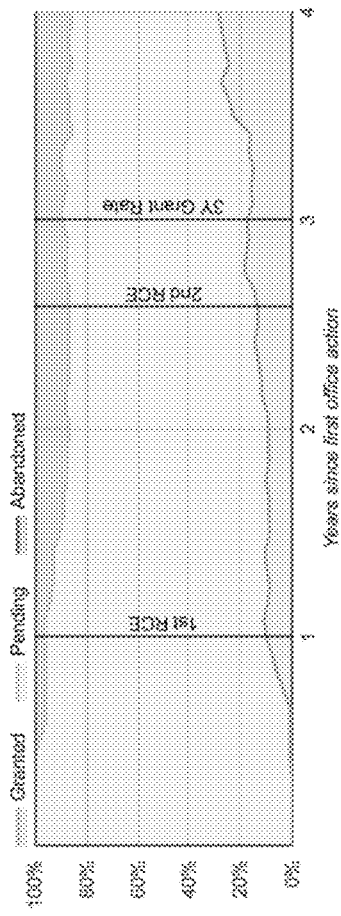
Figure 15E:
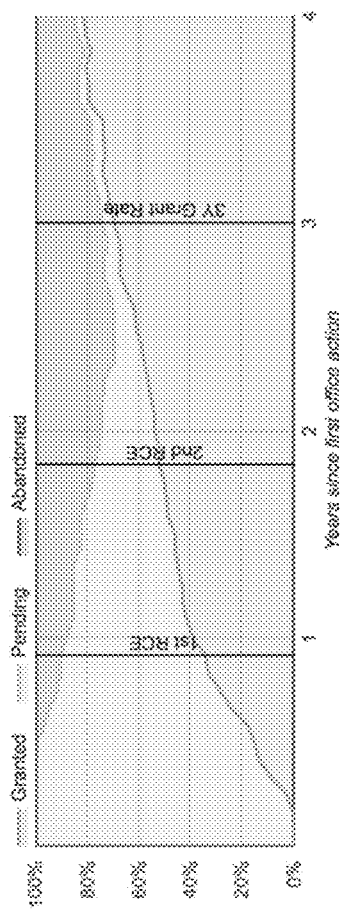

To compare the two grant rates, FIGS. 15D and E show the grant rate timelines for two examiners with the same backward grant rate but with very different three-year grant rates. FIG. 15D is the timeline for examiner DY from FIG. 16, and FIG. 15E is the timeline for examiner VP from FIG. 16. Examiner DY and VP each have backward grant rates of about 65%, but DY's three-year grant rate is 17% and VP's three-year grant rate is 70%. The timelines explain the difference. While the two examiners have similar backward grant rates, their three-year grant rates are very different because it takes years longer to get an issued patent with DY than with VP. It seems that examiner DY has many applications being prosecuted at even 5-6 years after the first office action. DY is clearly a much more difficult examiner than VP and this is reflected in the three-year grant rate. Here, the backward grant rate is not a good indicator because it assigns these two examiners the same difficulty level.

Figure 15F:
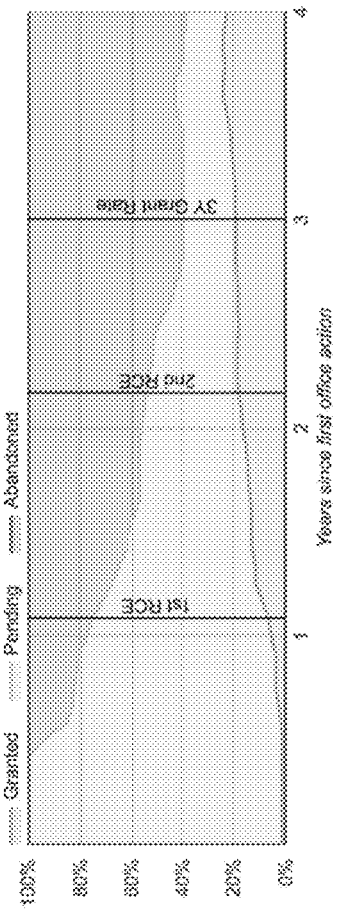

For another comparison, FIGS. 15D and F show the grant rate timelines for two examiners with the same three-year grant rate but with very different backward grant rates. FIG. 15F is the timeline for examiner BG from FIG. 16. For examiners DY and BG, you have about an 18% chance of getting an issued patent at three years after the first office action. The difference between DY and BG is the abandonment rate rather than the grant rate. For some reason, 60% of BG's cases are abandoned at three years and only 17% of DY's cases are abandoned at three years. One plausible explanation for the vastly different abandonment rates between DY and BG may be that DY's cases are much more valuable to the applicants (the group is "medical and surgical instruments") than BG's cases (the group is "amusement and education devices"). As a result, DY's applicants are willing to spend much more time and money on prosecution than BG's applicants. It may be more accurate to say that DY and BG have similar difficulty levels. The fact that DY's applicants are willing to spend more time and money on prosecution should not change the inherent difficulty level of the examiner. Because the three-year grant rate assigns them the same difficulty level (18%) and the backward grant rate gives them very different difficulty levels (65% and 20%), the three-year grant rate may be a more accurate indicator in this situation.

An advantage of the three-year grant rate is that it incorporates information about both the difficulty of the examiner and the length of time to obtain a patent into a single, easy to understand number. If an examiner has a three-year grant rate of 18%, then an attorney can explain to his or her client that they have an 18% chance of getting a patent issued in three years. For some examiners, such as in the examples above, the three-year grant rate may also provide a more accurate depiction of the difficulty of an examiner than the backward grant rate.

In addition, as compared with a single grant rate number, the full grant rate timeline provides more information in an easy to digest format. For some examiners, the timeline may show that they are difficult before the first RCE and much easier afterwards. For other examiners, the timeline may show that they make a decision early in prosecution and that it is hard to change their minds later. An attorney may be able to leverage this additional information to improve prosecution strategy, such as whether to file an RCE or a notice of appeal.

A three-year grant rate is an example of a number that may be computed to measure the difficulty of an examiner. As used herein, a number that may be computed to measure the difficulty of an examiner includes any number that may be computed using a number of granted patent applications and a total number of patent applications over a specified set of patent applications.

As used herein, a granted patent application may include any status of a patent application that indicates that a patent application has received at least some preliminary approval from the patent office. For example, a granted patent application may mean that the patent office has issued the patent, that the patent office has provided an issue notification that indicates a date when a patent will issue and what the patent number will be, or that a patent examiner has issued a notice of allowance.

The difficulty of a patent examiner may be determined by compiling information about patent applications examined by the patent examiner. Information about patent applications examined by the patent examiner may be publicly available, such as downloadable from a website run by the patent office. A set of patent applications may be specified for the patent examiner. For example, the set of patent applications may include all patent applications examined by the examiner or some subset of them, such as all patent applications filed after a specified date. It may be desired to use a set of relatively recent patent applications to reduce computational demands and to more accurately describe recent behavior of an examiner. For example, an examiner who has been at the patent office for 10 years may be currently more or less difficult than he or she was 10 years ago.

To determine a difficulty of a patent examiner, information may be compiled about each patent application in the set of applications at some time period after a start date, such as three years after the date of the first office action. Any appropriate start dates and time periods may be used.

The determination of a start date of a patent application may depend on the history of the patent application. For example, for all applications that have received at least one office action rejecting claims of the application, the start date may be the date of the earliest office action (perhaps excluding restriction requirements and other actions that do not evaluate the patentability of claims).

For patent applications that are granted (or allowed, etc.) without ever having received claim rejections, the start date may be the date of the notice of allowance. For patent applications that are abandoned without ever having received claim rejections, any appropriate start date may be used such as the filing date, abandonment date, or any other date from the file history. For patent applications that are currently pending (not granted and not abandoned) and have not yet received an office action, the application may not receive a start date and may be excluded from the analysis.

The difficulty of an examiner may be evaluated by compiling statistics of the applications examined by the examiner at the time period after the start date of each application. Any appropriate techniques may be used to compile statistics of the patent applications. In some implementations, counters may be used to count the number of applications with certain statuses at the time period after the start date of the application. For example, any of the following counters may be used.

A counter may represent the number of applications that have reached the time period after the start date. For example, where the time period is three years after the start date, and the start date of the patent application is the previous month, the patent application has not yet reached the time period after the start date. Where the time period is three years after the start date, and the start date of the patent application is 37 months ago, the patent application may have reached the time period after the start date.

In determining whether an application has reached the time period after the start date, an end date may be used. A patent application may be determined to have reached the time period after the start date if the start date plus the time period is less than the end date.

The end date may be a current date or a date earlier than the current date. For example, the end date may be the first of the month, the end of the previous month, or any other appropriate date. Using an end date that is not the current date may facilitate record keeping and presentation of the results. For example, when presenting information about the difficulty of examiners, the information may be presented as of the end date. Another way of looking at implementing this counter is that it may represent the number of applications where the start date is less than the end date minus the time period.

A counter may represent the number of patent applications that (i) have reached the time period after the start date and (ii) have a status of granted (or allowed etc.) by the time period after the start date. Another way of looking at this counter is that it may represent the number of applications where (i) the start date is less than the end date minus the time period and (ii) the application was granted by the time period after the start date.

A counter may represent the number of patent applications that have reached the time period after the start date and have a status of abandoned by the time period after the start date. Another way of looking at this counter is that it may represent the number of applications where (i) the start date is less than the end date minus the time period and (ii) the application was abandoned by the time period after the start date.

A counter may represent the number of patent applications that have reached the time period after the start date and have a status of pending at the time period after the start date. Another way of looking at this counter is that it may represent the number of applications where (i) the start date is less than the end date minus the time period and (ii) the application was pending (not granted and not abandoned) at the time period after the start date.

One or more of the counters may then be used to compute the number for measuring the difficulty of the patent examiner. For example, the number for measuring the difficulty of the patent examiner may be computed as the percentage of applications that have reached the time period after the start date that are granted. In some implementations, the number may be computed as:

$$100 \times \frac{\text{n\_granted}}{\text{n\_reached}}$$

where n_granted is the number of patent applications that (i) have reached the time period after the start date and (ii) are granted by the time period after the start date, and n_reached is the number of patent applications that have reached the time period after the start date.

In some implementations, the number may be computed as:

$$100 \times \frac{\text{n\_granted}}{\text{n\_granted} + \text{n\_pending} + \text{n\_abandoned}}$$

where n_pending is the number of patent applications that (i) have reached the time period after the start date and (ii) are pending at the time period after the start date, and n_abandoned is the number of patent applications that (i) have reached the time period after the start date and (ii) are abandoned by the time period after the start date.

In some implementations, the above computations may be performed for multiple time periods, such as a number of months ranging from 1 month to 48 months. A timeline may then be created that represents a difficulty of the examiner at each time period, such as the timelines presented above.

In some implementations, the dates may be rounded off to a month to simplify the computations. For example, the day of the month may be dropped from each date so that each date is represented as a month and a year.

In some implementations, the above computations may be performed for a group of examiners, such as an art unit, group, technical center, or the entire patent office. When performing the above computations for a group of examiners, the counts may be determined for all examiners of the group.

In some implementations, a number representing the difficulty of an examiner may be compared to a number representing the difficulty of a group of examiners, such as the art unit of the examiner. Presenting such a comparison may assist a patent attorney in determining prosecution strategy (such as whether to file an appeal or an RCE).

In some implementations, counters may be used to determine a number of applications meeting other criteria by the time period after the start date, such as any of the following counters: (i) a number of applications with a notice of appeal in the file history that are granted, pending, or abandoned by the time period after the start date; (ii) a number of applications with at least one RCE in the file history that are granted, pending, or abandoned by the time period after the start date; or (iii) a number of applications with at least one interview in the file history that are granted, pending, or abandoned by the time period after the start date.

Any of the above counters may be used to compute a number for measuring the difficulty of a patent examiner. In some implementations, examiner statistics or timelines may be implemented as described in the following clauses, combinations of the following clauses, or in combination with other techniques described herein.

Clause 1. A method for computing a number for measuring a difficulty of a patent examiner, the method comprising: selecting a time period for computing the number for measuring the difficulty of the patent examiner; selecting an end date; obtaining information about a plurality of patent applications examined by the patent examiner; selecting a start date for each patent application of the plurality of patent applications using the information about the plurality of patent applications; computing a first number corresponding to a first plurality of patent applications wherein each patent application of the first plurality of patent applications (i) was granted by the time period after the start date of the patent application and (ii) the start date of the patent application plus the time period is less than the end date; computing a second number corresponding to a second plurality of patent applications wherein, for each patent application of the second plurality of patent applications, the start date of the patent application plus the time period is less than the end date; and computing the number for measuring the difficulty of the patent examiner using the first number and the second number.

Clause 2. The method of clause 1, wherein the time period is three years.

Clause 3. The method of clause 1, wherein the end date is a current date.

Clause 4. The method of clause 1, wherein the plurality of patent applications examined by the patent examiner comprise all patent applications examined by the patent examiner with a filing date after a specified date.

Clause 5. The method of clause 1, wherein the start date for a patent application that has received at least one office action is a date of an earliest office action.

Clause 6. The method of clause 1, wherein the start date for a patent application that received a notice of allowance without previously receiving a rejection from the patent examiner is a date of the notice of allowance.

Clause 7. The method of clause 1, wherein the start date for a patent application that was abandoned before receiving an office action is a filing date of the patent application.

Clause 8. The method of clause 1, further comprising: computing a third number corresponding to a third plurality of patent applications wherein each patent application of the third plurality of patent applications (i) was pending at the time period after the start date of the patent application and (ii) the start date of the patent application plus the time period is less than the end date; computing a fourth number corresponding to a fourth plurality of patent applications wherein each patent application of the fourth plurality of patent applications (i) was abandoned by the time period after the start date of the patent application and (ii) the start date of the patent application plus the time period is less than the end date.

Clause 9. The method of clause 1, wherein computing the number for measuring the difficulty of the patent examiner comprises computing a percentage of applications that were granted by the time period after the start date of the plurality of patent applications.

Clause 10. The method of clause 1, wherein computing the number for measuring the difficulty of the patent examiner comprises dividing the first number by the second number.

Clause 11. The method of clause 1, further comprising presenting the number for measuring the difficulty of the patent examiner to a person.

Clause 12. The method of clause 1, further comprising: computing a grant rate timeline comprising a plurality of grant rates, wherein: each grant rate corresponds to a time period after a start date; and the plurality of grant rates comprise the number for measuring the difficulty of the patent examiner.

Clause 13. A system for computing a number for measuring a difficulty of a patent examiner, the system comprising one or more computers configured to implement the method of clause 1.

Clause 14. A device for computing a number for measuring a difficulty of a patent examiner, the device comprising a processor and a memory, and the device configured to implement the method of clause 1.

Clause 15. One or more non-transitory computer-readable media comprising computer executable instructions that, when executed, cause at least one processor to perform the method of clause 1.

IMPLEMENTATION

Depending on the implementation, steps of any of the techniques described above may be performed in a different sequence, may be combined, may be split into multiple steps, or may not be performed at all. The steps may be performed by a general purpose computer, may be performed by a computer specialized for a particular application, may be performed by a single computer or processor, may be performed by multiple computers or processors, may be performed sequentially, or may be performed simultaneously.

The techniques described above may be implemented in hardware, in software, or a combination of hardware and software. The choice of implementing any portion of the above techniques in hardware or software may depend on the requirements of a particular implementation. A software module or program code may reside in volatile memory, non-volatile memory, RAM, flash memory, ROM, EPROM, or any other form of a non-transitory computer-readable storage medium.

Conditional language used herein, such as, "can," "could," "might," "may," "e.g.," is intended to convey that certain implementations include, while other implementations do not include, certain features, elements and/or steps. Thus, such conditional language indicates that the features, elements and/or steps are not required for some implementations. The terms "comprising," "including," "having," and the like are synonymous, used in an open-ended fashion, and do not exclude additional elements, features, acts, operations. The term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

While the above detailed description has shown, described and pointed out novel features as applied to various implementations, it can be understood that various omissions, substitutions and changes in the form and details of the devices or techniques illustrated may be made without departing from the spirit of the disclosure. The scope of inventions disclosed herein is indicated by the appended claims rather than by the foregoing description. All changes which come within the meaning and range of equivalency of the claims are to be embraced within their scope.

What is claimed is:

1. A computer-implemented method, comprising:
providing first data comprising hypertext markup language (HTML), wherein the first data comprises:
a first reference label,
first reference label text corresponding to the first reference label,
a second reference label,
second reference label text corresponding to the second reference label,
one or more paragraphs of a patent specification,
a first HTML element that encloses the first reference label, wherein the first HTML element includes first metadata indicating an error corresponding to the first reference label, and
a second HTML element that encloses the second reference label, wherein the second HTML element includes second metadata indicating a warning corresponding to the second reference label; and
providing second data comprising computer-executable instructions that, when executed, cause at least one processor to perform actions comprising:
binding an event handler to an HTML element of the first data,
receiving a user-interface event corresponding to the event handler,
obtaining the first reference label using the user-interface event,
obtaining a first paragraph of the patent specification, wherein the first paragraph comprises the first reference label, and
causing the first paragraph to be displayed to a user.

2. The computer-implemented method of claim 1, wherein the first data comprises:
a first figure number associated with the first reference label, and
a second figure number associated with the second reference label.

3. The computer-implemented method of claim 1, wherein the first HTML element stores information about the first reference label in third metadata.

4. The computer-implemented method of claim 3, wherein the third metadata comprises an attribute of the first HTML element.

5. The computer-implemented method of claim 1, wherein the first metadata causes presentation of the first reference label using a first color and the second metadata causes presentation of the second reference label using a second color, and wherein the first color is different from the second color.

6. The computer-implemented method of claim 1, wherein the user-interface event corresponds to a click or double click of the first HTML element.

7. The computer-implemented method of claim 1, wherein causing the first paragraph to be displayed comprises causing a dialog box to be displayed.

8. The computer-implemented method of claim 1, wherein causing the first paragraph to be displayed comprises annotating the first reference label in the first paragraph.

9. The computer-implemented method of claim 7, wherein the dialog box includes controls for viewing other paragraphs comprising the first reference label.

10. A system, comprising at least one computing device comprising at least one processor and at least one memory, the at least one computing device configured to:
receive first data comprising hypertext markup language (HTML), wherein the first data comprises:
a first reference label,
first reference label text corresponding to the first reference label,
a second reference label,
second reference label text corresponding to the second reference label,
one or more paragraphs of a patent specification,
a first HTML element that encloses the first reference label, wherein the first HTML element includes first metadata indicating an error corresponding to the first reference label, and
a second HTML element that encloses the second reference label, wherein the second HTML element includes second metadata indicating a warning corresponding to the second reference label;
bind an event handler to an HTML element of the first data,
receive a user-interface event corresponding to the event handler,
obtain the first reference label using the user-interface event,
obtain a first paragraph of the patent specification, wherein the first paragraph comprises the first reference label, and
cause the first paragraph to be displayed to a user.

11. The system of claim 10, wherein the first data comprises:
a first count corresponding to a number of times the first reference label text appears in the patent specification with the first reference label, and
a second count corresponding to a number of times the second reference label text appears in the patent specification with the second reference label.

12. The system of claim 10, wherein the first data comprises:
third reference label text corresponding to the first reference label.

13. The system of claim 10, wherein the at least one processor is configured to:
bind a second event handler to an HTML element of the first data,
receive a second user-interface event corresponding to the second event handler,
obtain a second paragraph of the patent specification, wherein the second paragraph comprises the first reference label and the first reference label text, and
cause the second paragraph to be displayed to the user.

14. The system of claim 13, wherein causing the second paragraph to be displayed comprises annotating the first reference label and the first reference label text in the second paragraph.

15. The system of claim 10, wherein the first data comprises an HTML table that encloses the first reference label, the first reference label text, the second reference label, and the second reference label text.

16. The system of claim 15, wherein the first data comprises (a) the HTML table in a first tab and (b) the one or more paragraphs of the patent specification in a second tab.

17. The system of claim 10, wherein the one or more paragraphs of the patent specification in the first data are not displayed before receiving the user-interface event.

18. One or more non-transitory computer-readable media comprising computer executable instructions that, when executed, cause at least one processor to perform actions comprising:
generating first data comprising hypertext markup language (HTML), wherein the first data comprises:
a first reference label,
first reference label text corresponding to the first reference label,
a second reference label,
second reference label text corresponding to the second reference label,
one or more paragraphs of a patent specification,
a first HTML element that encloses the first reference label, wherein the first HTML element includes first metadata indicating an error corresponding to the first reference label, and
a second HTML element that encloses the second reference label, wherein the second HTML element includes second metadata indicating a warning corresponding to the second reference label; and
generating second data comprising computer-executable instructions that, when executed, cause at least one processor to perform actions comprising:
binding an event handler to an HTML element of the first data,
receiving a user-interface event corresponding to the event handler,
obtaining the first reference label using the user-interface event,
obtaining a first paragraph of the patent specification, wherein the first paragraph comprises the first reference label, and
causing the first paragraph to be displayed to a user.

19. The one or more non-transitory computer-readable media of claim 18, wherein the second data comprises computer-executable instructions that, when executed, cause the at least one processor to perform actions comprising:
binding a second event handler to an HTML element of the first data,
receiving a second user-interface event corresponding to the second event handler,
obtaining a second paragraph of the patent specification, wherein the second paragraph comprises the first reference label and the first reference label text, and
causing the second paragraph to be displayed to the user.

20. The one or more non-transitory computer-readable media of claim 18, wherein causing the first paragraph to be displayed comprises annotating the first reference label in the first paragraph.

\* \* \* \* \*